United States Patent
Timmer et al.

(10) Patent No.: US 6,442,914 B1
(45) Date of Patent: Sep. 3, 2002

(54) TAGGING SYSTEM FOR INSERTING TAGS INTO PLANT CONTAINERS

(75) Inventors: Randall H. Timmer, Grandville; Stephen P. Shaw, Hudsonville, both of MI (US)

(73) Assignee: Rapid Automated Systems, Inc., Jenison, MI (US)

( * ) Notice: Subject to any disclaimer, the term of this patent is extended or adjusted under 35 U.S.C. 154(b) by 0 days.

(21) Appl. No.: 09/723,669

(22) Filed: Nov. 28, 2000

Related U.S. Application Data

(60) Provisional application No. 60/167,863, filed on Nov. 29, 1999.

(51) Int. Cl.$^7$ .................................................. B65B 5/00
(52) U.S. Cl. ............................ 53/235; 53/534; 53/247; 414/797; 414/797.8; 271/90; 271/108
(58) Field of Search ........................... 53/51, 234, 235, 53/255, 249, 247, 250, 260, 534, 539, 238.8; 414/797.8, 798.9; 271/108, 90

(56) References Cited

U.S. PATENT DOCUMENTS

| | | | |
|---|---|---|---|
| 1,980,983 A | 11/1934 | Currie | 271/27 |
| 2,182,187 A | 12/1939 | Wagner | 226/51 |
| 2,414,434 A | 1/1947 | Bedworth et al. | 226/85 |
| 2,667,420 A | 1/1954 | Meulemans et al. | 99/171 |
| 2,808,766 A | 10/1957 | Larsen | 93/49 |
| 2,953,883 A | 9/1960 | Gentry | 53/209 |
| 3,005,631 A | 10/1961 | McVicker et al. | 271/27 |
| 3,269,724 A | 8/1966 | Lefief | 271/27 |
| 3,287,011 A | 11/1966 | Currie, Jr. | 271/12 |
| 3,390,875 A | 7/1968 | Beert et al. | 271/5 |
| 4,359,314 A | 11/1982 | Hellmer | 425/503 |
| 4,373,848 A | 2/1983 | Bishop | 414/403 |
| 4,427,192 A | 1/1984 | Kushmaul et al. | 271/11 |
| 4,574,556 A | 3/1986 | Schmidt et al. | 53/69 |
| 4,781,318 A * | 11/1988 | Meyers | 227/67 |
| 4,787,533 A | 11/1988 | Haroutel et al. | 221/12 |
| 4,848,764 A | 7/1989 | Tajima et al. | 271/90 |
| 4,917,663 A | 4/1990 | Pazdernik | 493/416 |
| 4,947,579 A | 8/1990 | Harrison et al. | 47/1.01 |
| 4,996,820 A | 3/1991 | Harrison, Jr. | 53/69 |
| 5,133,169 A * | 7/1992 | Tesch, Jr. et al. | 53/247 |
| 5,289,666 A | 3/1994 | Hamilton | 53/252 |
| 5,456,570 A | 10/1995 | Davis et al. | 414/742 |
| 5,547,336 A * | 8/1996 | Whiteman | 414/798.9 |
| 5,911,631 A | 6/1999 | Bouldin et al. | 47/1.01 |
| 5,953,887 A * | 9/1999 | Lucas et al. | 53/534 |

FOREIGN PATENT DOCUMENTS

| | | |
|---|---|---|
| GB | 712031 | 7/1954 |
| JP | 269824 | 11/1987 |

* cited by examiner

Primary Examiner—Rinaldi I. Rada
Assistant Examiner—Thanh K. Truong
(74) Attorney, Agent, or Firm—Van Dyke, Gardner, Linn & Burkhart, LLP

(57) ABSTRACT

A tagging apparatus for placing tags into a container includes a support surface for holding at least one container, a tag insert assembly frame, a tag holder, and a tag handler mounted to the tag insert assembly frame. The tag handler includes an arm and a guide. The arm is configured for reciprocal movement between a first position in which the arm is positioned for grabbing a tag from the tag holder and a second position in which the arm is positioned for inserting the tag into a container supported on the support surface. The guide provides lateral support to the arm when the arm is moved between its first and second positions and, further, defines a path of movement for the arm between its first and second positions. The tagging apparatus also includes a driver for moving the arm between its first and second positions.

45 Claims, 16 Drawing Sheets

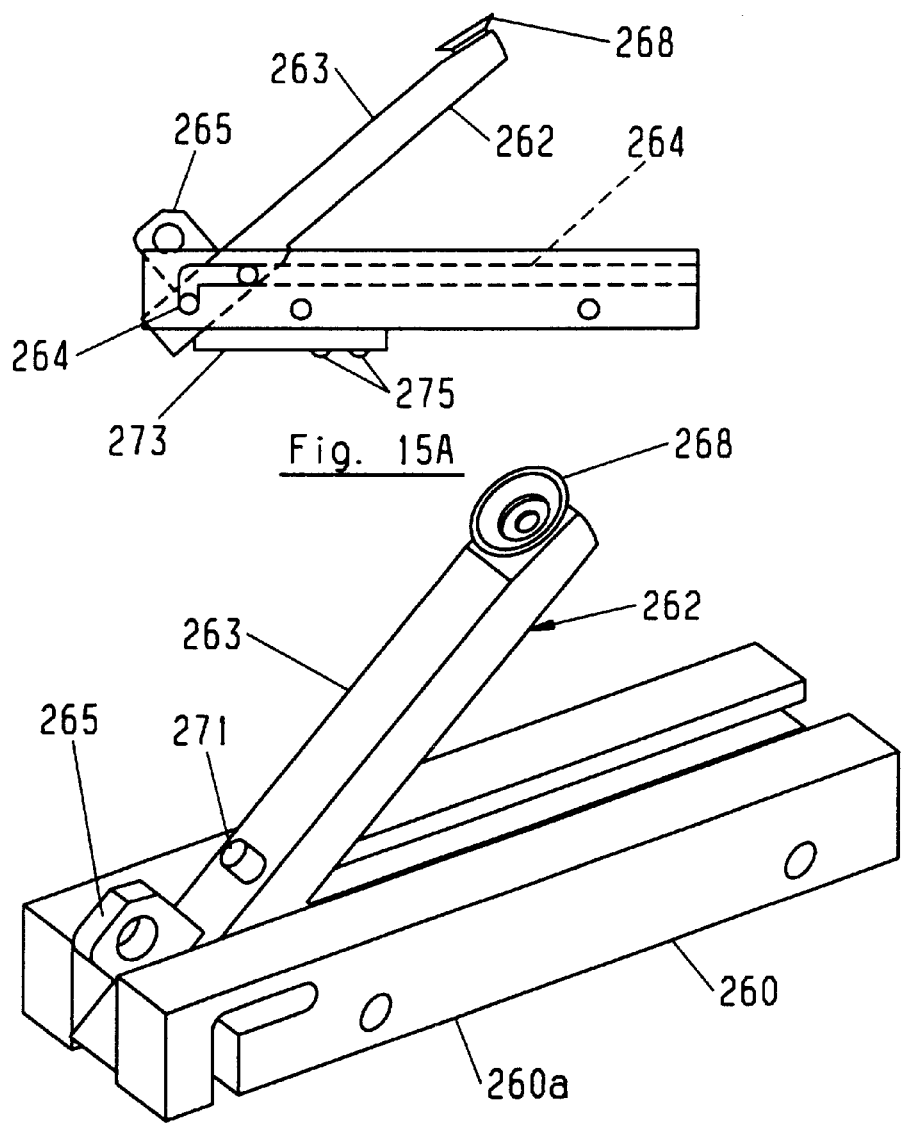
Fig. 15A
Fig. 15B
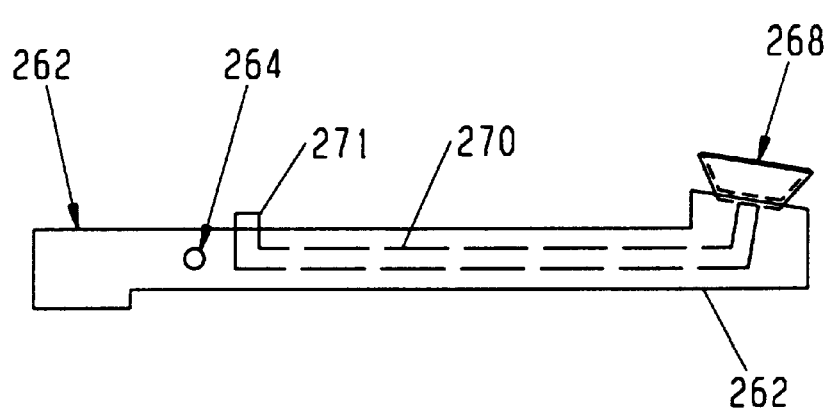
Fig. 15C

TAGGING SYSTEM FOR INSERTING TAGS INTO PLANT CONTAINERS

This application claims priority from provisional application Ser. No. 60/167,863, filed Nov. 29, 1999, for a TAGGING SYSTEM FOR INSERTING TAGS INTO PLANT TRAYS, which is herein incorporated by reference in its entirety.

TECHNICAL FIELD AND BACKGROUND OF THE INVENTION

The present invention relates to a tagging system and, more particularly, to a tagging system for inserting tags into plant containers, such as pots, trays, and trays supporting pots or the like.

Conventional tagging systems include a conveyor and one or more tag insert assemblies. The tag insert assembly is positioned over the conveyer and includes a frame and one or more arms which are rotatably mounted to the frame, for example on a common shaft. Each arm includes a gripping device, such as a suction cup, which is used to grab a respective tag from a tag holder. The arm is swung between a first position in which the arm grabs a tag from the tag holder and a second position in which the tag is inserted into the respective cell of the plant container. Other tagging systems include pivoting arms which are supported on a moving frame. The arms pivot about the moving frame between a first position, in which the arm grabs a tag from a tag holder, and thereafter are moved to a second position wherein the frame is moved to insert the tag into the plant container. Heretofore, these tagging systems have typically required the plant containers to stop during the insertion process. As a result, these tagging systems have not operated at economical speeds.

Consequently, there is a need for a tagging system which can operate at high processing speeds to optionally permit insertion "on the fly" without the risk of binding and, further, all in a manner at which permits the insertion of a tag into the container to be achieved without inducing significant, if any, damage to the plant in the plant container.

SUMMARY OF THE INVENTION

Accordingly, a tagging system of the present invention provides an improved tagging process in which containers can be tagged "on the fly". Furthermore, the tagging system optionally provides for a modular design which permits readjustments of the components of the tagging system to accommodate various plant sizes, container sizes, container configurations or the like. one form of the invention, a tagging apparatus for placing tags into a container includes a support surface for holding at least one container, a tag insert assembly frame, a tag holder, and a tag handler which is mounted to the tag insert assembly frame. The tag handler includes an arm and a guide, with the arm configured for reciprocal movement between a first position in which the arm is positioned for grabbing a tag from the tag holder and a second position in which the arm is positioned for inserting the tag into a container supported on a support surface. The guide provides lateral support to the arm when the arm is moved between its first and second positions and, further, defines a path of movement for the arm between its first and second positions. The tagging apparatus further includes a driver for moving the arm between its first and second positions.

In a further aspect, the tagging apparatus further includes a conveyor assembly. The conveyor assembly includes a conveyor frame and a conveying surface, with the conveying surface supported on the conveyor frame and defining the support surface. The tag insert assembly frame is supported in the conveyor frame.

In another aspect, the driver comprises a cylinder, for example a pneumatic cylinder. Optionally, the cylinder is supported by the tag insert assembly frame.

According to another aspect, the guide comprises a channel shaped member having an elongate passage. The arm extends through the elongate passage when moving between its first and second positions. For example, in one form, the arm is guided in the passage of the channel shaped member by a carriage member. In a further aspect, the arm is pivotally mounted to the carriage.

In other aspects, the arm includes a suction cup for grabbing a tag. The suction cup is optionally coupled to a vacuum system, which generates a vacuum in the suction cup to grip a tag and releases the grip of the suction cup on the tag when the tag is inserted into the container.

According to another form of the invention, a tagging apparatus for placing tags into a container includes a conveyor, a tag insert assembly, and a driver. The tag insert assembly includes a support frame and at least one tag dispenser. The tag dispenser includes a tag holder for holding a stack of tags and a tag handler, which includes a pivot arm and a guide member. The guide member guides the arm to move between a first position in which the arm is positioned for grabbing a tag from the tag holder and a second position in which the arm is positioned for inserting a tag into a container supported on the conveying surface of the conveyor. The guide includes a guide path and spaced apart facing sides, which provide lateral support to the arm when the arm moves between its first and second positions. The driver moves the arm between its first and second positions.

In one aspect, the guide path is a generally L-shaped guide path. In a further aspect, the guide member comprises a channel shaped member, which defines the spaced apart facing sides that provide lateral support to the arm when the arm is moved between its first and second positions.

In another aspect, the arm includes a suction cup for grabbing a tag from the tag holder. In a further aspect, the arm comprises an elongate block member and preferably includes a suction cup at a distal portion of the elongate block member. In order to provide vacuum at the suction cup, the elongate block member includes a transverse passage that extends through the arm which is in communication with the suction cup and, further, is adapted to communicate with a pneumatic supply for generating a vacuum in the suction cup for grabbing a tag from the tag holder.

According to another aspect, the guide member includes a generally L-shaped guide path. Furthermore, the guide member includes an adjustable stop, which adjusts the generally L-shaped guide path in order to adjust the angle of the arm when the arm is in its first position.

According to yet another form of the invention, a tag handler of a tagging apparatus includes a guide member having a generally channel shaped cross section defining an elongate passage there along and an arm. The arm has a proximate portion and a distal portion, with the distal portion including a suction cup and the proximate portion pivotally mounted in an elongate passage of the guide member. The arm is adapted to move through the elongate passage of the guide member from the first position in which the proximate portion pivots in the elongate passage and the distal portion of the arm is pivoted outwardly from the guide member for positioning to grip a tag from a tag holder with the suction cup and a second position in which the arm is aligned in the elongate passage and moved along the elongate passage with the distal portion extending from the elongate passage for positioning to insert a tag into a container. In one aspect, the guide member comprises a plastic guide member.

According to another aspect, the arm comprises an elongate block member. Furthermore, the arm optionally includes an internal passage in communication with the suction cup and a port for coupling to a vacuum supply for generating a vacuum in the suction cup.

In another aspect, the guide includes a pair of guide tracks in the elongate passage. The arm includes guide pins for engaging the guide tracks to guide the arm along the elongate passage. In a further aspect, the guide tracks comprise L-shaped tracks. In addition, the terminal ends of the L-shaped tracks are optionally adjustable to adjust the angular orientation of the arm when the arm is moved to its first position.

These and other objects, advantages, purposes, and features of the invention will become more apparent from the study of the following description taken in conjunction with the drawings.

DETAILED DESCRIPTION OF THE DRAWINGS

FIG. 15A is an enlarged side view of a tag handler of one of the tag insert assemblies of FIGS. 11–14;

FIG. 15B is an enlarged perspective view of the tag handler illustrating the pivot arm pivoted to a tag engaging position;

FIG. 15C is a side view of the pivot arm of the tag handler of FIGS. 15A and 15B;

DESCRIPTION OF THE PREFERRED EMBODIMENTS

Figure 1:
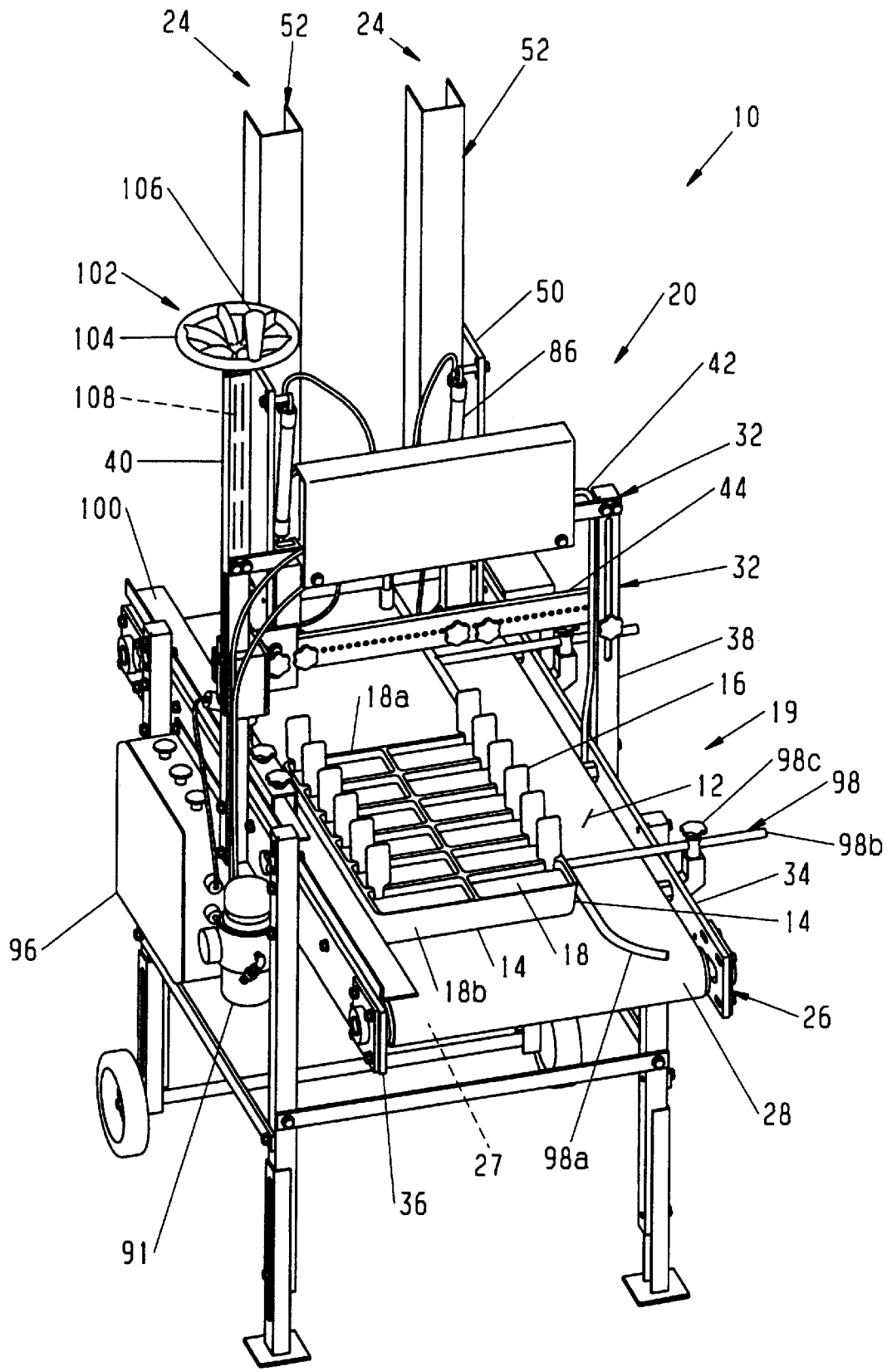
FIG. 1 is an end perspective view of a first embodiment of the tagging system of the present invention.
Figure 3:
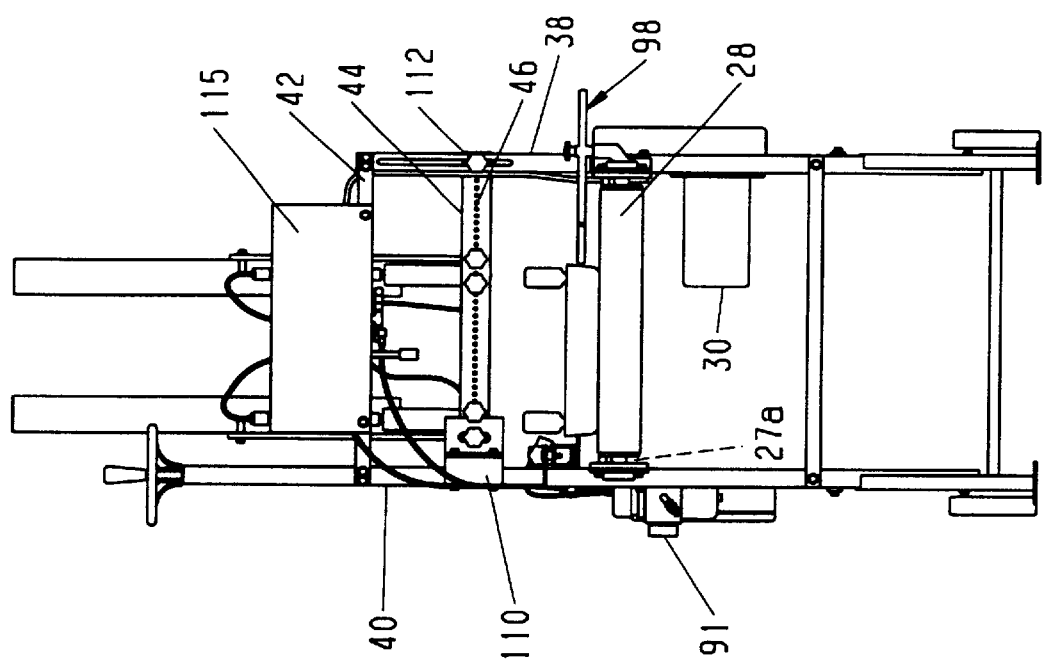
FIG. 3 is an elevation view of the discharge end of the tagging system of FIG.
Figure 2:
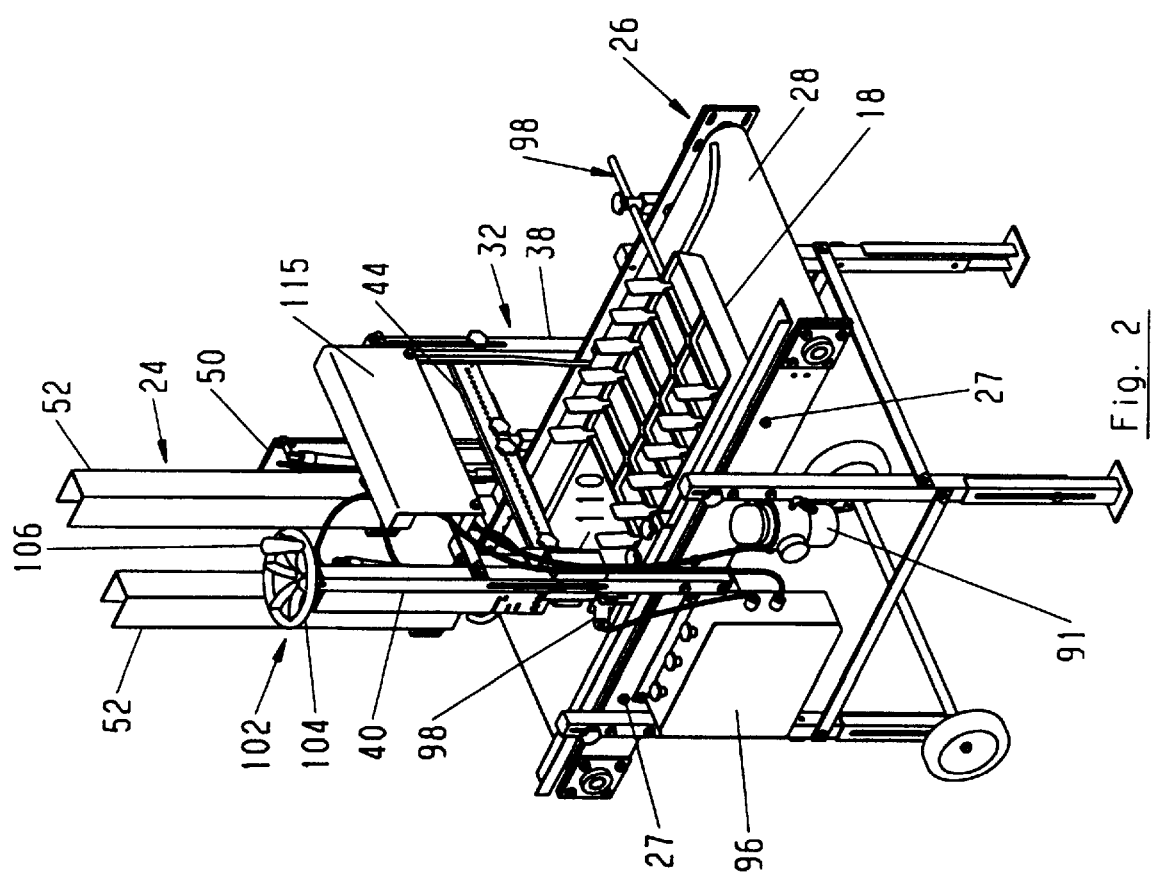
FIG. 2 is a side perspective view of the tagging system of FIG. 1.

Referring to FIGS. 1–3, the numeral 10 generally designates a tagging system of the present invention. Tagging system 10 includes a support surface 12 on which a container 14, such as a tray, is supported while tags 16 are inserted into the respective cells 18 of container 14. As will be more fully described below, tagging system 10 incorporates a tagging apparatus or tag insert assembly 20 which is preferably of modular design, to permit adjustment of the tag insert assembly so that containers and/or plants of different configurations and sizes may be handled by tagging system 10. In addition, tag insert assembly 20 is adapted to insert tags "on the fly" all in a manner which minimizes, if not eliminates, damage to the plant in the container, as will be more fully described below.

In the illustrated embodiment, support surface 12 is provided by a conveyor 19 to permit tagging apparatus 10 to be placed in line with a conveyor system. However, it should be appreciated, that tagging system 10 may incorporate a fixed or a stationary support surface, including rollers or the like, with the containers manually moved across the support surface after the tagging process has been completed. In addition, tagging system 10 may be adapted to fit over an existing support surface, such as a conveyor.

Tag insert assembly 20 includes one or more tag handlers 22 (FIGS. 5, 7, and 8) and a corresponding plurality of tag holders 24, such as tag magazines, which hold a plurality of tags that are grabbed and inserted by tag handler 22 which together form tag dispenser units. As will be more fully described, the tag handlers of the present invention permit increased cycle speeds and, therefore, increased processing speeds. As a result, the tag handlers of the present invention permit "tagging on the fly." Furthermore, the tag handlers move out of the way of the plants when moved to their retracted or tag grabbing positions and also have slim profiles which reduce the impact on or damage to the plants.

Conveyor 19 includes a conveyor frame 26, which supports a plurality of rollers 27, and a conveyor belt 28 which extends over rollers 27 and defines support surface 12. Alternately, conveyor 19 may include a plurality of closely spaced rollers with the surface defined by the rollers, as would be understood by those skilled in the art. Conveyor 19 is driven by a motor 30 (FIG. 3), which is preferably supported by frame 26 beneath conveyor belt 28 and which includes an output shaft which is drivingly coupled to one of the rollers, such as end roller 27a (FIG. 3). Thus when motor 30 is energized, belt 28 moves in a conveying direction such as indication by the arrow in FIG. 4.

Tag insert assembly 20 also includes a support frame 32, which straddles support surface 12 and is optionally mounted to side frame members 34 and 36 of conveyor frame 26 to thereby form a compact, modular assembly. In the illustrated embodiment, support frame 32 is of modular design and includes a pair of spaced vertical frame members 38 and 40 and a pair of transverse support or cross frame members 42 and 44, with transverse frame member 44 being adjustably mounted to vertical frame members 38 and 40, for example by a sliding block arrangement described in greater detail below. In the illustrated embodiment, transverse frame members 42 and 44 comprise plate members, with plate member 44 having a plurality of mounting openings 46 to provide a plurality of mounting positions for tag handlers 22 and tag holders 24 and, therefore, permit adjustment. In this manner, tag handlers 22 and/or tag holders 24 may be adjusted to a plurality of horizontal positions along transverse member 44 and, further may vertically adjusted by adjustment of transverse member 44 along vertical frame members 38 and 40. Transverse frame member 42 provides stiffness to frame 32 and additionally and optionally provides a mounting surface for the pneumatic components of the control system described below.

Figure 4:
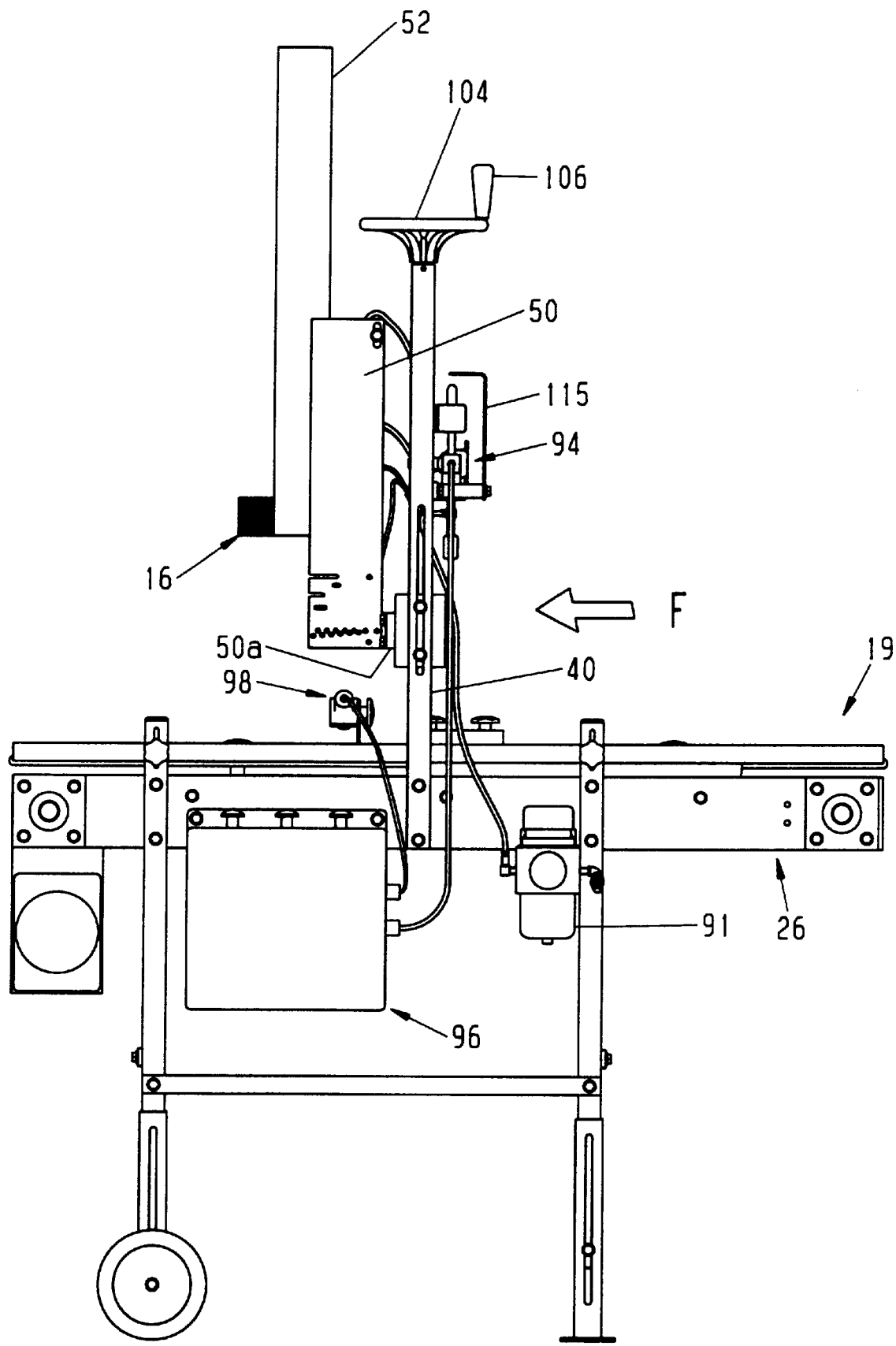
FIG. 4 is a right side elevation view of the tagging system of FIG. 1.

Referring to FIG. 4, in the illustrated embodiment, each tag handler 22 and tag holder 24 are mounted to a common mounting plate 50 to thereby form a tagging dispenser unit. Mounting plate 50 mounts tag handler 22 and tag holder 24 to transverse member 44 of frame 32 by angle members 50a (FIG. 5) which, in the illustrated embodiment, are secured or mounted to transverse member 44 by fasteners, such as bolts, including bolts with knobs for manual adjustment. In this manner, tag handler 22 and tag holder 24, along with their associated components, can be quickly and easily adjusted along transverse member 44 by merely adjusting the position of mounting plate 50. Furthermore, the vertical position of the tag dispenser units may be adjusted quickly by raising or lowering member 44.

Figure 5:
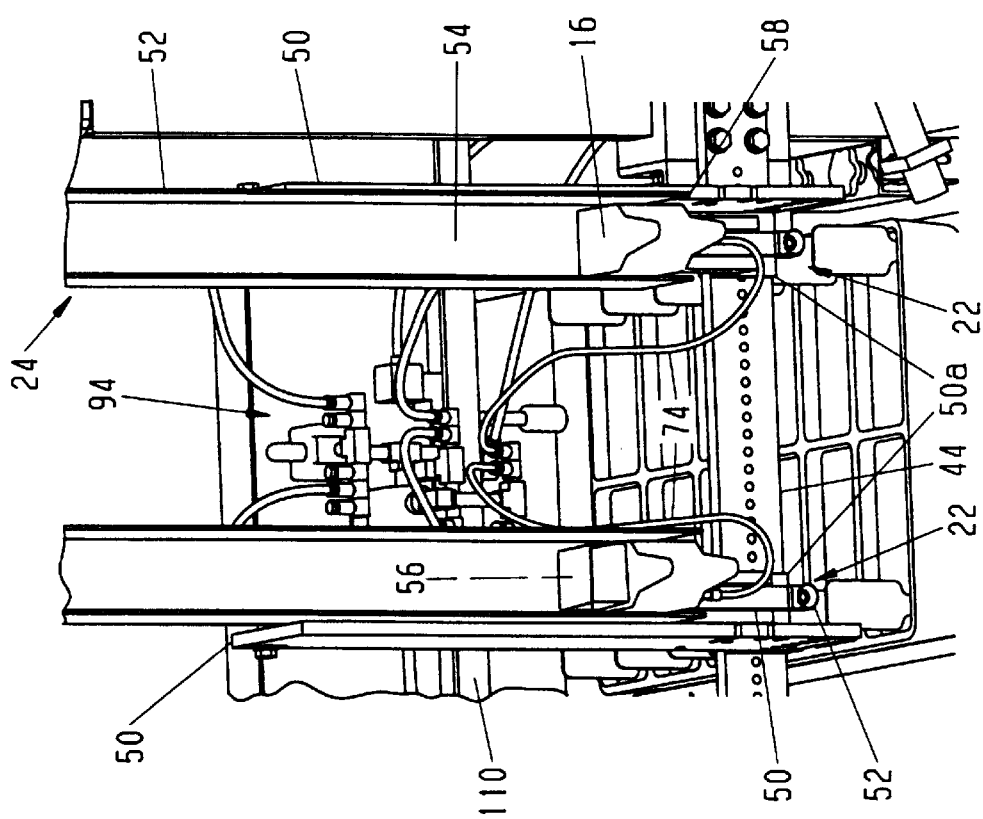
FIG. 5 is an enlarged elevation view of the tag insert assemblies viewed from the feed end of the tagging system.

Each tag holder or magazine 24 is formed from an elongate channel-shaped member 52 that holds a plurality of tags 16 in the elongate passageway 54 of channel-shaped member 52 (FIG. 5). Optionally, a weight 56 may be placed on top of the stack of tags to urge the tags to the lower end of channel-shaped member 52. Lower end 58 of channel-shaped member 52 is open and positioned to align with a respective tag handler 22 whereby the tag handler 22 can grab a lowermost tag, as will be more fully described below. Tags 16 are typically held in channel-shaped member 52 by friction between their free edges and the inner surface of channel-shaped member 52. Optionally, lower end 58 may include an inwardly extending lip or the like, which retains a stack of tags in tag holder 24 and yet permits the tag handler to remove a lowermost tag because of the flexural/flexible properties of the tags, as will be understood by those skilled in the art.

Referring to FIGS. 9 and 10A–10C, each tag handler 22 includes a guide member 60 and an articulating arm 62 which is mounted in a transverse passage 64 of guide member 60 by a carriage 66. Mounted to the distal portion of arm 62 is a suction cup 68, which is used to grab a lowermost tag 16 from tag holder 24. Arm 62 generally comprises an elongate block member but includes an internal passageway 69 which extends through arm 62 from suction cup 68 to a port 70, which permits coupling of suction cup 68 to a vacuum generator 72 by a hose 74 in order to form a vacuum in passageway 69 and in suction cup 68 to grab a tag 16.

Figure 8:
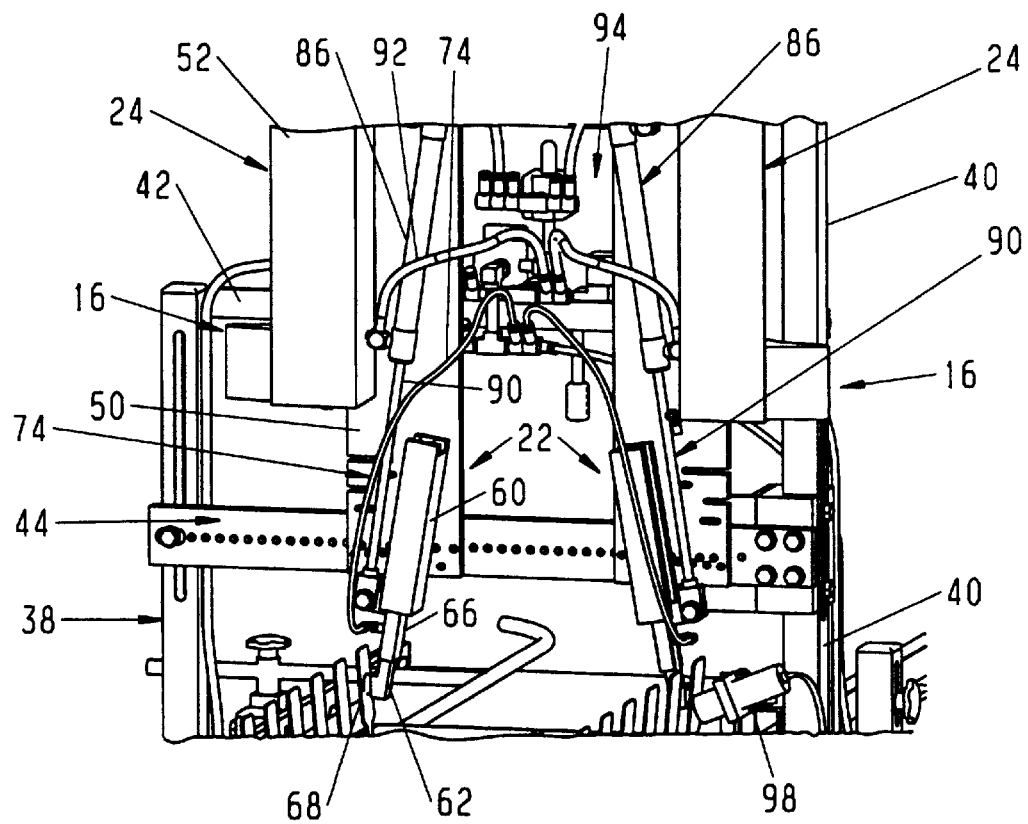
FIG. 8 is a similar perspective view of the tag insert assemblies in FIG. 7 illustrating the tag insert assembly arms in a tag inserting position.
Figure 9:
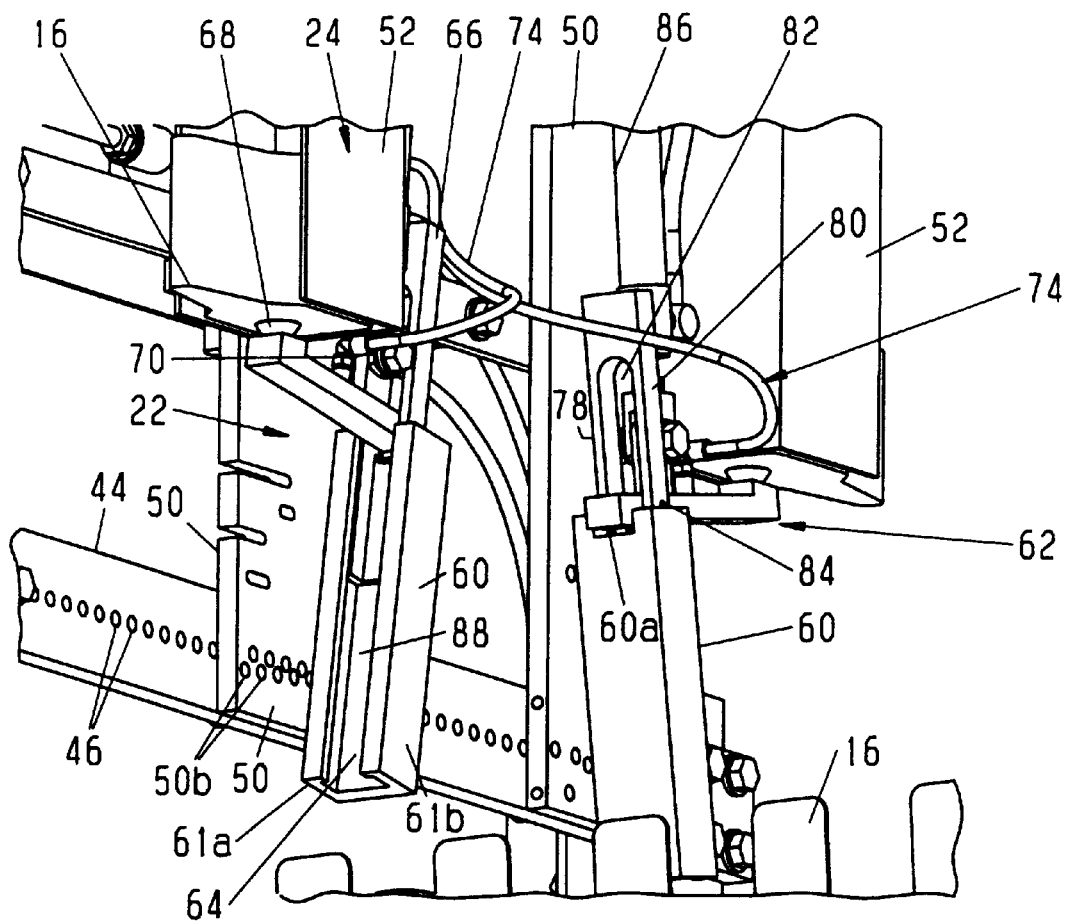
FIG. 9 is an enlarged perspective view of the tag insert assemblies of FIG. 7.
Figure 10A:
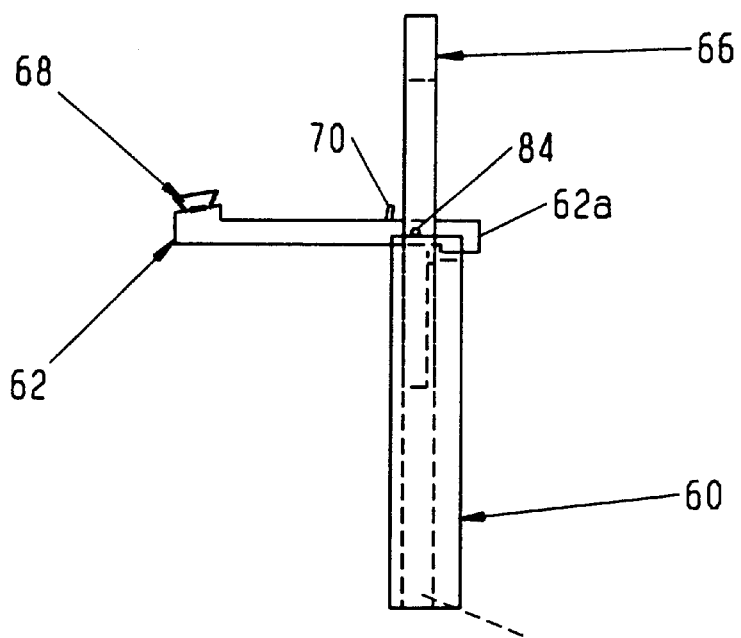
FIG. 10A is an elevation view of a tag handler of the tag insert assemblies illustrating a pivot arm mounted to a carriage which is slidably mounted in a guide or slide block, with the pivot arm pivoted to a tag gripping position.
Figure 10B:
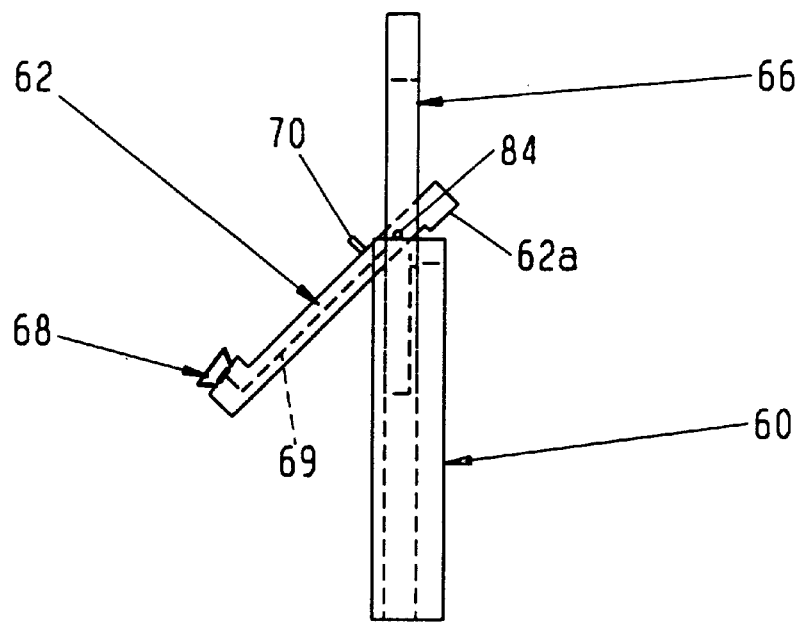
FIG. 10B is a similar view to FIG. 10A, with the pivot arm being pivoted toward a sliding position within the guide block.
Figure 10C:
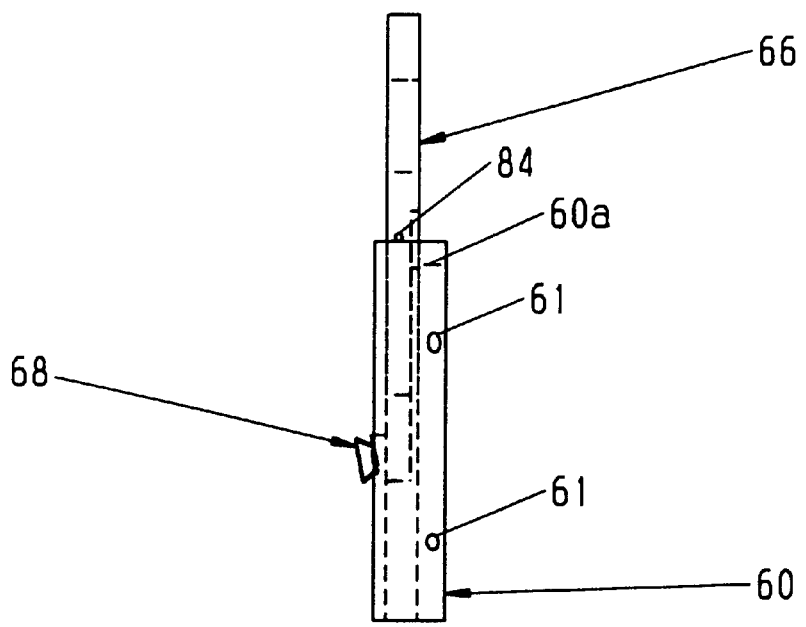
FIG. 10C is a similar view to FIGS. 10A and 10B, with the pivot arm pivoted to a sliding position within the guide block for movement to a tag insertion position.
Figure 12:
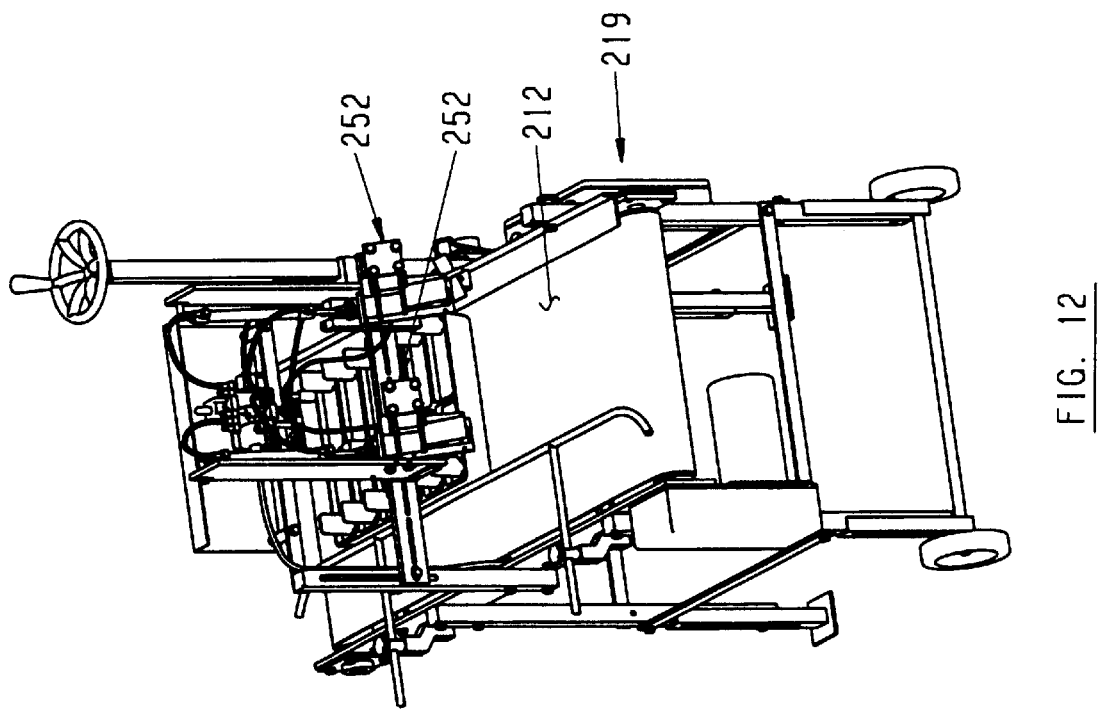
FIG. 12 is a perspective view of the feed end of the tagging system of FIG. 11.

As best seen in FIG. 9, carriage 66 comprises an inverted generally U-shaped member and includes a pair of spaced apart arms 78 and 80 and a transverse elongate opening 82 defined between arms 78 and 80. Arm 62 of tag handler 22 is pivotally mounted between arms 78 and 80 of carriage 66 by a transverse pin 84 to permit arm 62 to pivot about carriage 66 between a recessed position in which arm 62 is aligned with and positioned between arms 78 and 80 of carriage 66 (as shown in FIG. 10C) and extended positions (as shown in FIG. 10A) in which arm 62 is pivoted to a tag grabbing or first position for engaging a lowermost tag 16 from tag holder 24 (FIG. 9). Arm 62 is pivoted between its first position and a recessed position (in which arm 62 is aligned in carriage 66) by a driver, such as cylinder 86 (see FIGS. 7 and 8), as will be more fully described below.

In order to support tag handlers 22 on frame 32, guide member 60 includes a plurality of mounting openings 61 (FIG. 10C) which receive fasteners to mount guide members 60 to plate 50, which in turn includes a plurality of mounting openings 50b so that tag handlers 22 can be oriented in a number of different configurations on plates 50 to accommodate different size containers and plant heights. In the embodiment illustrated in FIG. 9, guide member 60 is mounted to plate 50 so that its open side 88 is facing the direction generally orthogonal to the direction of flow of containers 14 on conveyor 19. However, as can be appreciated from FIG. 5, guide member 60 can be mounted with its open side 88 facing the discharge end or facing in a direction parallel to the direction of flow of conveyor 19.

Figure 7:
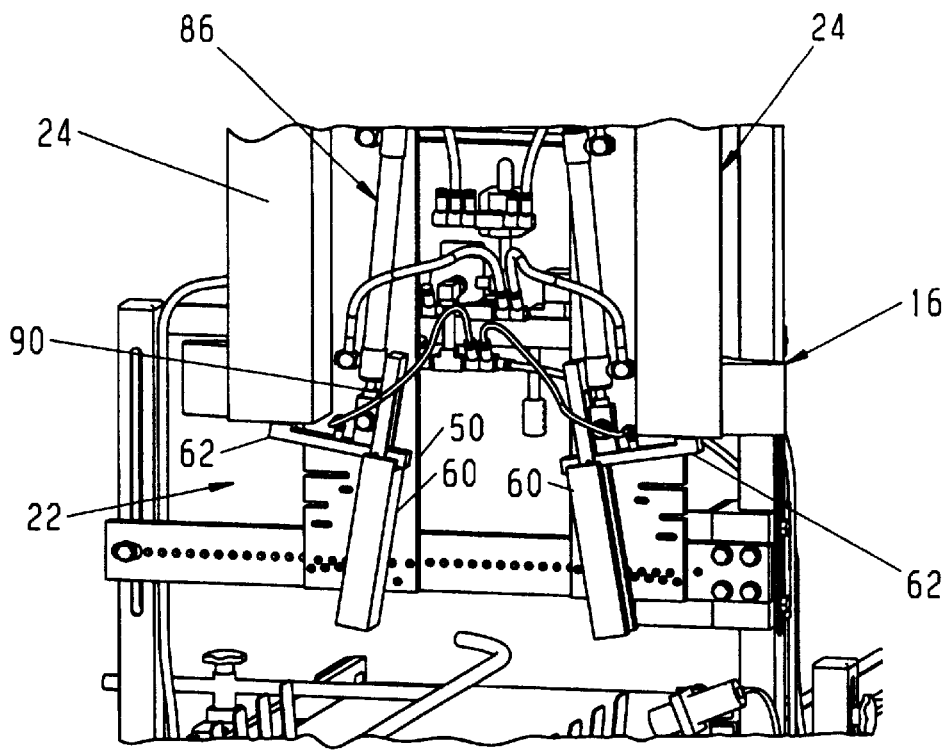
FIG. 7 is an enlarged view of two tag insert assemblies of the tagging system of FIG. 1 illustrating the tag insert assembly rotated 90° and tag insert assembly arms in a tag grabbing position.

Again referring to FIG. 7, 9, and 10A–10C, when cylinder 86 contracts its rod 90, which is coupled to arm 62 at a generally medial portion of arm 62, arm 62 pivots about pin 84 and extends outwardly from carriage 66 such that suction cup 68 is positioned beneath lowermost tag 16 where suction cup 68 can grab the lowermost tag. As rod 90 is extended by cylinder 86, arm 62 pivots about pin 84 in carriage 66. As best seen in FIGS. 7, 9, and 10A approximate end 62a of arm 62 projects through opening 82 of carriage 66 when arm 62 is pivoted to its first or tag grabbing position. In addition, proximate end portion 62a rests on an upper part, preferably a grooved portion 60a of guide member 60. As arm 62 pivots about pin 84, however, proximate end portion 62a disengages from groove portion 60a; thus permitting arm 62 and carriage 66 together to slide down elongate passageway 64 of guide member 60. In this manner, the initial extension of cylinder 86 induces only pivoting or rotation of arm 62 about pin 84. Only after proximate end portion 62a of arm 62 is disengaged from grooved portion 60a, does further extension of rod 90 induce linear motion of carriage 66 and arm 62. Thus, when rod 90 is fully extended by cylinder 86, arm 62 and carriage 66 are extended from guide member 60 whereby arm 62 is in its second or tag insertion position (see FIG. 8). When rod 90 is retracted by cylinder 86, carriage 66 and arm 62 slide upwardly in elongate passage 64 of guide member 60 until pin 84 passes groove portion 60a of guide member 60 at which point arm 62 starts to pivot about pin 84 to return to its tag grabbing position illustrated in FIGS. 7 and 9. In this manner, arm 62 is guided for reciprocal movement between its first and second positions by guide member 60. In addition, guide member 60 provides lateral support to arm 62 and its carriage 66 by virtue of its channel shape with its opposed facing sides 61a and 61b (FIG. 9). By providing a combined pivoting and telescoping action, arm 62 is supported in a manner that limits play between arm 62 and guide 60 and, further, in a manner which permits high speed tag insertion such that tagging apparatus 10 can tag on the fly. For example, tagging system 10 can tag containers at a rate of 450 flats per hour, with 12 tags per flat.

Figure 6:
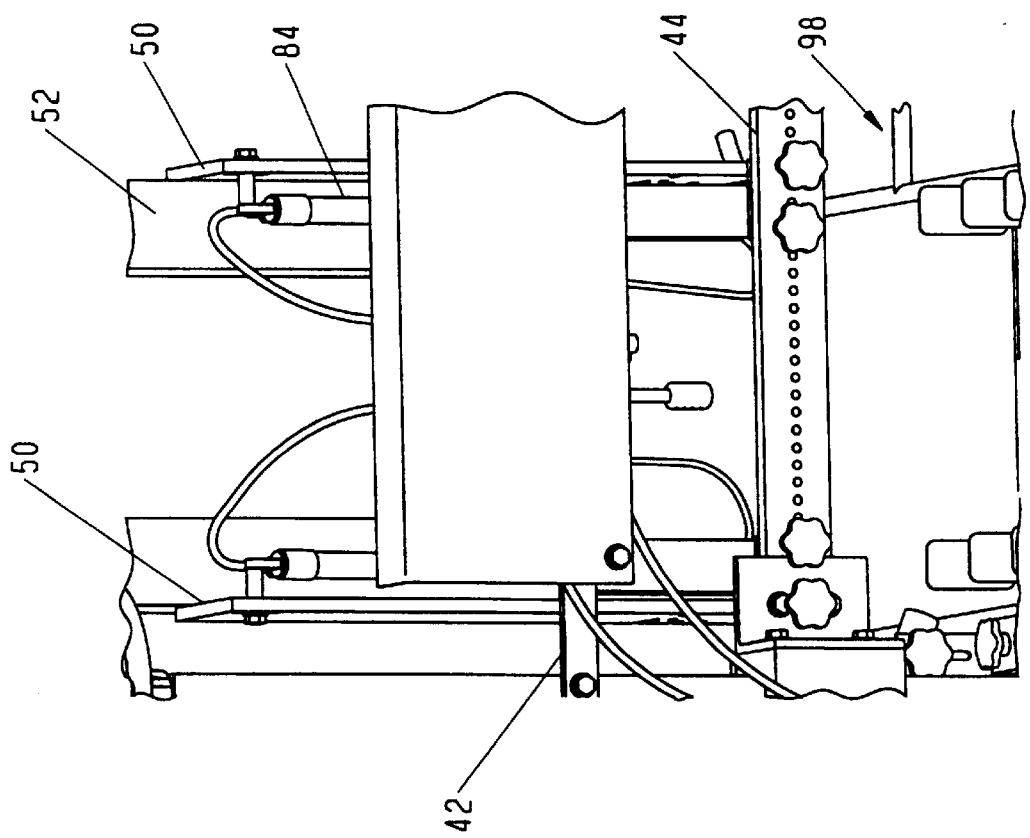
FIG. 6 is an enlarged elevation view similar to FIG. 4 illustrating the tag insert assemblies as viewed from the discharge end of the tagging system.

Preferably, cylinder 86 is a pneumatic cylinder and is coupled to a pneumatic supply 91 by tubing 92. Tubing 92 and tubing 74 are each coupled to supply 91 through solenoid valves 94, which in the illustrated embodiment are mounted to cross-frame member 42. Optionally frame 32 may include a protective cover 115 mounted to cross-frame member 42 to shield valves 94 and their connections to tubing 92. Solenoid valves 94 are in communication with and actuated by a controller 96 (FIG. 6), which is optionally mounted to conveyor frame 26. In addition, tagging system 10 includes a sensor 98 which is mounted to frame 26 and positioned to detect the forward edge 18a of container 14 as it passes beneath tag insert assembly 20. In operation, controller 96 detects the presence of a container 14 using sensor 98 and, further, detects the trailing edge 18b of container 14 to terminate the insertion sequence. In preferred form, when controller 96 detects the leading edge 18a of container 14, controller 96 actuates the vacuum in suction cup 68 to grab the lowermost tag in tag holder 52. Once a tag is grabbed, controller 96 then opens solenoid valves 94 to deliver air pressure to cylinders 86 so that rods 90 extend. As rod 90 extends, arm 62 pivots around pin 84 until arm 62 is at least generally aligned in carriage 66 such that continued extension of rod 90 causes carriage 66 to slide down guide 60 until tag 16 is inserted into container 14. Once rod 90 is fully extended, controller 86 releases the vacuum on suction cup 68 to thereby release hold of the tag. Once the tag is released from suction cup 68, controller 96 actuates the cylinders 86 to retract rod 90 thereby moving arm 62 from its insertion position back to its grabbing position. This sequence is repeated until the sensor 98 detects the trailing edge of container 14. It should be understood that in some applications, it may be advantageous or desirable for controller 96 to include a single sequence in each cycle, for example, when tagging pots.

Referring again to FIG. 1, tagging system 10 may include container guides 98 mounted to conveyor frame 26. Container guides 98 includes a rail 98a and a plurality of support arms 98b, which are respectively mounted in adjustable supports 98c. In this manner, the position of rail 98a can be adjusted to accommodate different widths of containers. Rails 98a provides a guide so that container 14 remains properly aligned on conveying surface 12 of conveyor 19. In addition, frame 26 optionally further includes a spacer member 100, such as an angle member, which spaces the container 14 inwardly of the outer edge of conveyor belt 28. Together, rail 98a and spacer 100 provide a defined path therebetween for container 14.

As previously noted, transverse member 44 of frame 32 is optionally movably mounted to vertical support members 38 and 40. In this manner, the position of insert assembly 20 may be easily adjusted to accommodate different plant sizes and container sizes. In the illustrated embodiment, tag insert assembly 20 includes a driver 102, such as a manual driver, which moves cross frame member 44 vertically along vertical frame member members 38 and 40. In the illustrated embodiment, driver 102 includes a wheel 104 and a handle 106, which are coupled to a drive screw 108 which extends through vertical frame member 40. Coupled to drive screw 108 is mounting block 110, which in turn supports cross frame member 44. As drive screw 108 is rotated, mounting block 110 moves up or down vertical from member 40. Cross frame member 44 moves with mounting block and is supported and guided at its other end by a manually adjustable mounting block 112, which is captured in vertical frame member 38.

Figure 11:
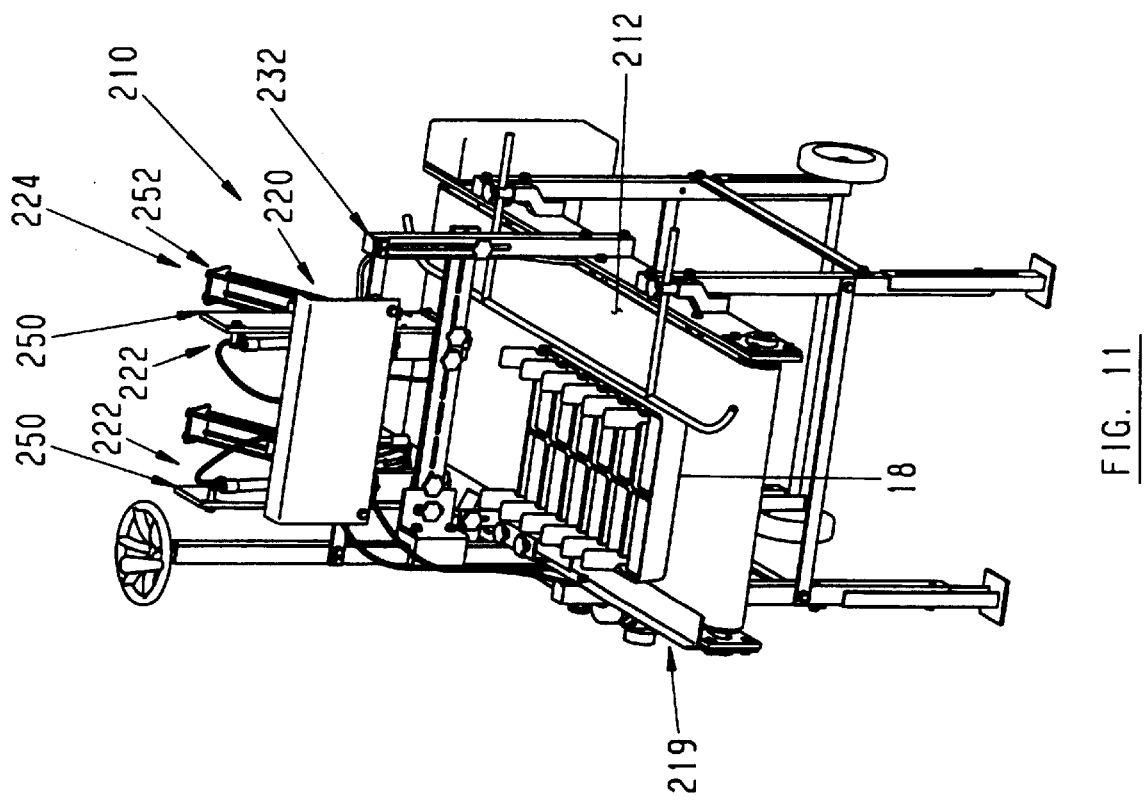
FIG. 11 is a perspective view of a second embodiment of the tagging system of the present invention.

Referring to FIG. 11, a second embodiment 210 of the tagging system of the present invention is illustrated. Tagging system 210 includes a support surface 212 and a tag insert assembly 220, which straddles the support surface 212, similar to the previous embodiment. Support surface 212 is provided by a conveyor 219 and supports and transports one or more containers 14 while tags are inserted "on the fly" in a similar manner to the previous embodiment.

Tag insert assembly 220 includes a frame 232 (similar to frame 32) and a plurality of one or more tag dispensers 224. Each tag dispenser 224 includes a tag holder 252 and a tag handler 222, similar to the previous embodiment. Preferably, tag handlers 252 and tag holders 224 are commonly supported on a mounting member 250, which mounts tag dispensers 224 to frame 232. For further details of frame 232 and conveyor 219, reference is made to the previous embodiment.

Figure 14:
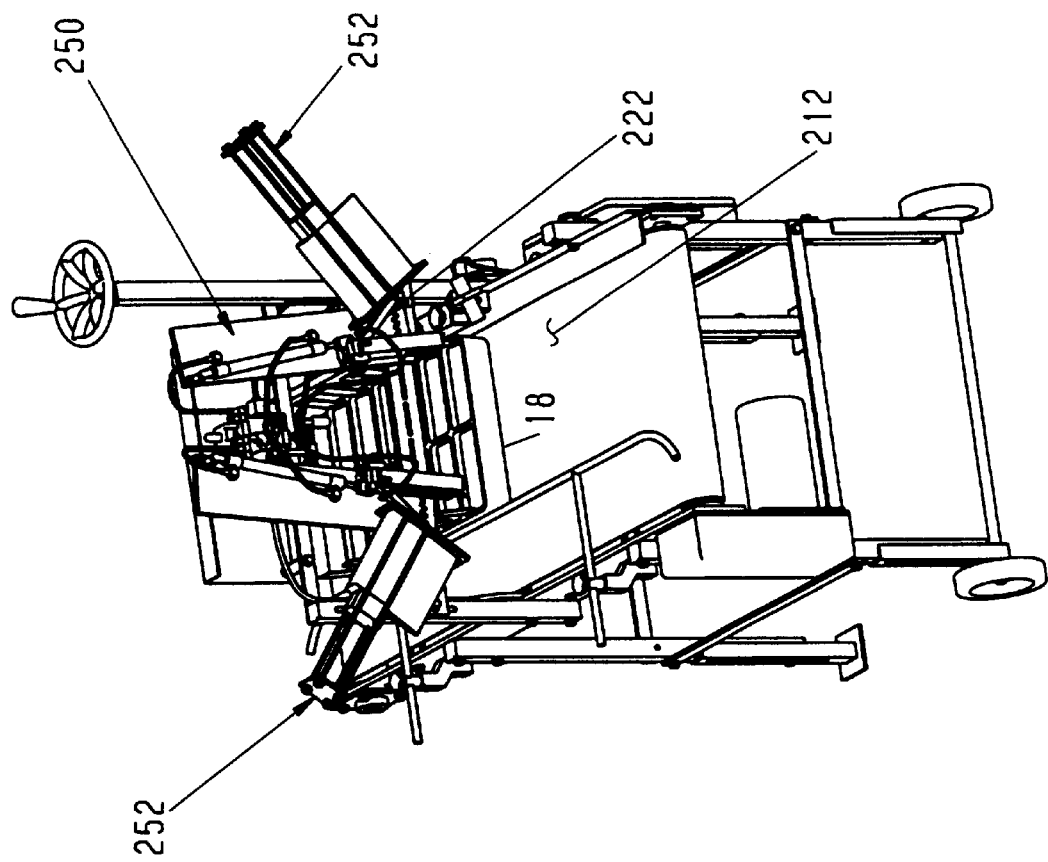
FIG. 14 is a perspective view of the feed end of the tagging system illustrated in FIG. 13.
Figure 13:
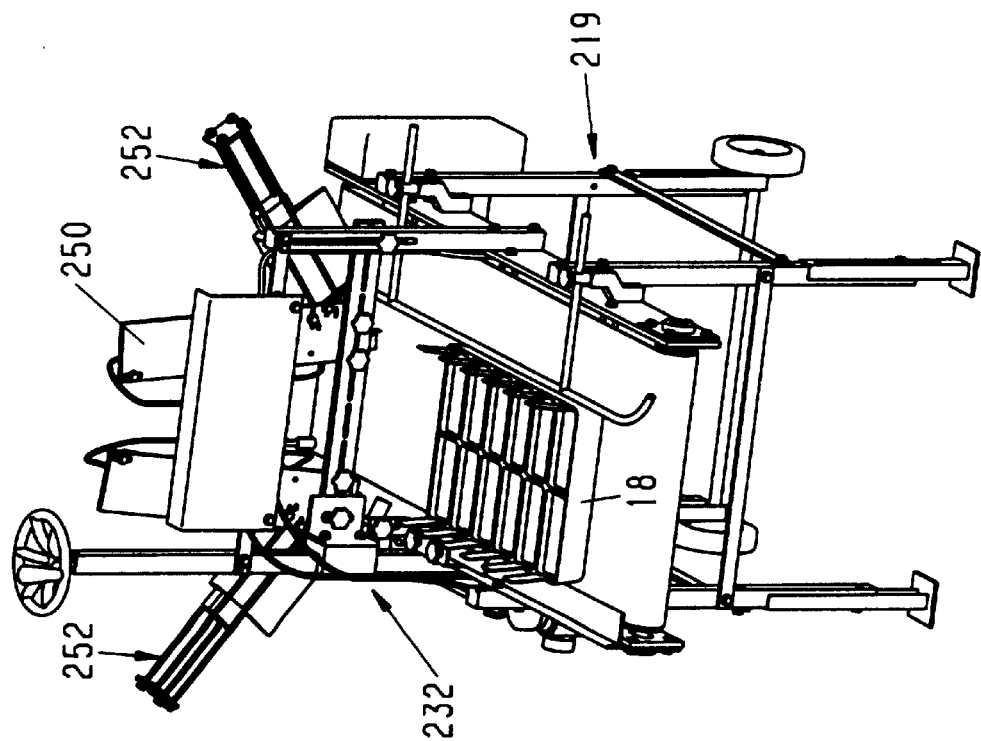
FIG. 13 is a perspective view of the tagging system of FIG. 11 illustrating a second configuration of the tag insert assemblies as viewed from the discharge end of the tagging system.

As best seen in FIGS. 11–14, tag dispensers 224 may be positioned such that tag holders 252 lie in planes which are generally parallel with the direction of flow of the conveyor 219 (FIGS. 11 and 12) or may be angled in a plane, typically a common plane, which is generally orthogonal to the direction of flow (as seen in FIGS. 13 and 14). The orientation of the tag dispensers 224 is dependent on the type of plants, container sizes, cell sizes, and/or size of tags to be inserted and may be adjusted as need by mounting tag holders 252 and handles 222 to different mounting openings in mounting plates 250 as would be understood by those skilled in the art. As will be more fully described below, the relative orientation of each handler 222 with respect to each holder 252 may be adjusted as well.

Figure 15:
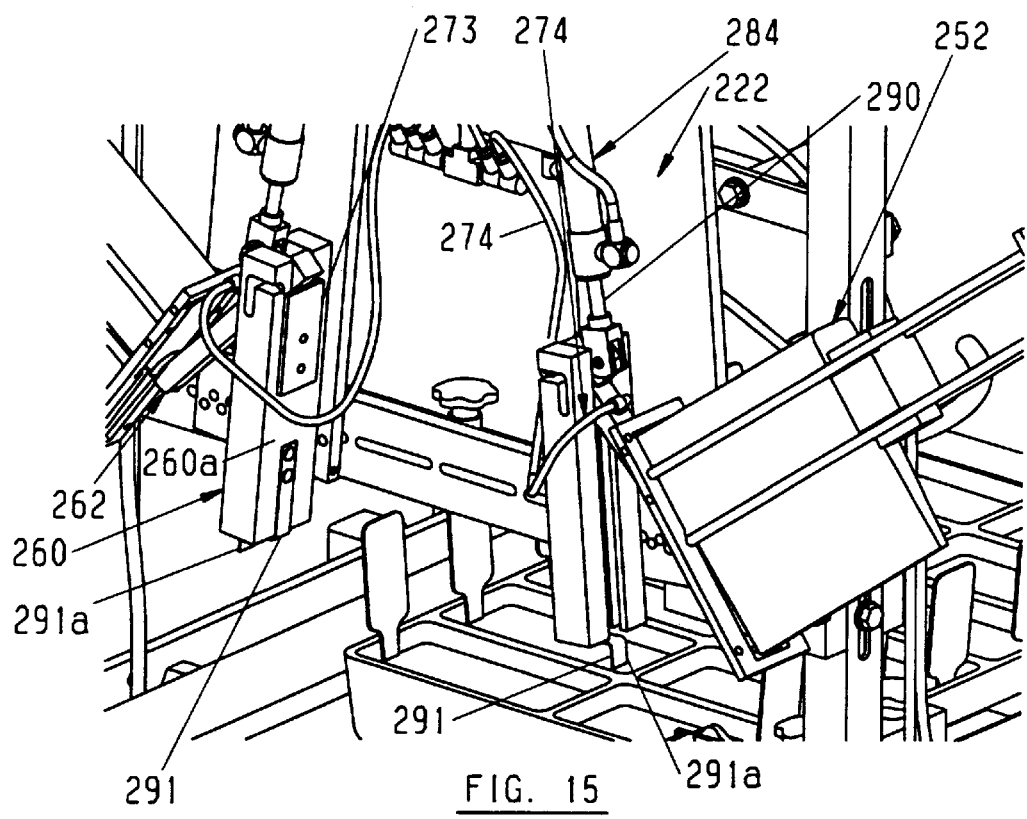
FIG. 15 is an enlarged side perspective view of the tag insert assemblies of FIGS. 13 and 14.
Figure 16:
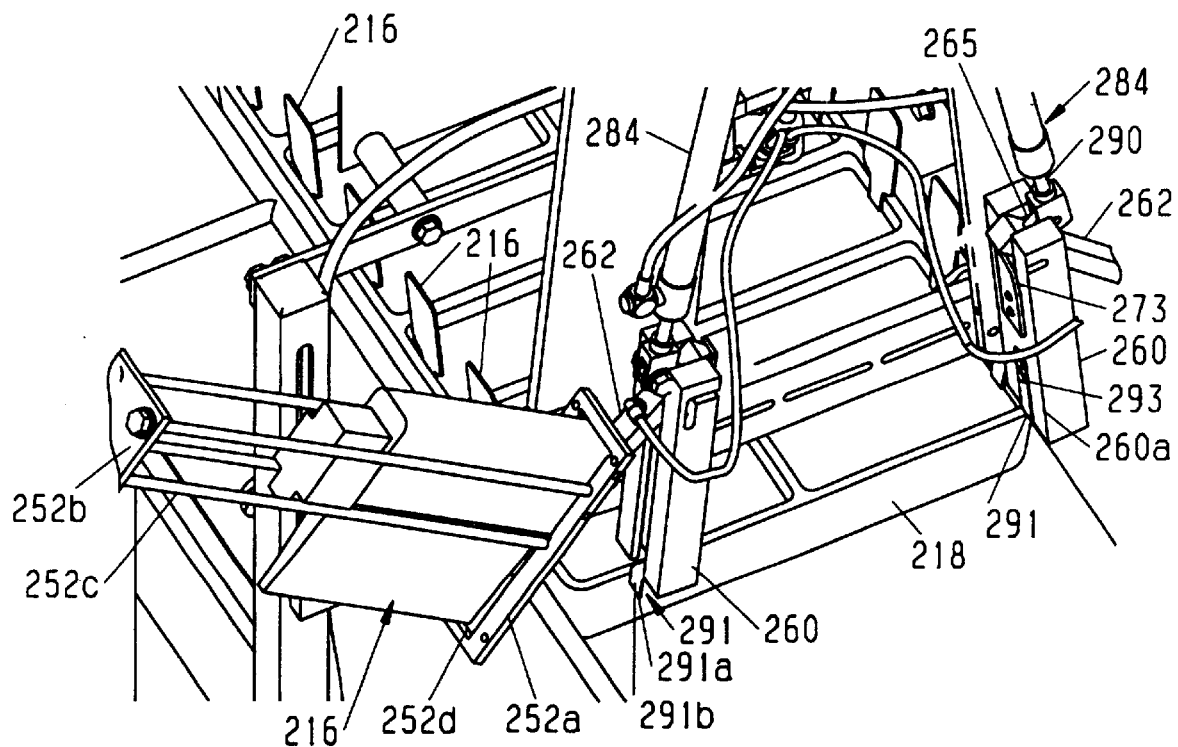
FIG. 16 is a second enlarged side perspective view of a tag insert assembly of FIGS. 13–14.

Referring to FIGS. 15 and 15A–15C, each tag handler 222 includes a guide block 260 and a pivot arm 262. Pivot arm 262 comprises an elongate block member 263 and includes a pair of opposed pins 264 which extend outwardly from elongate block member 263. Guide block 260 includes a generally channel-shaped cross-section and, further, includes L-shaped guide tracks 264 in which pins 264 are positioned to guide arm 262 to move between its tag grabbing position (as shown in FIG. 15A) and its tag inserting position (FIG. 15B). Tag insert assembly 220 further includes a cylinder 284 for each tag handler 222. Each cylinder 284 includes a rod, which is pivotally mounted to arm 262 by a mounting tab 265 (FIGS. 16 and 15B). In this manner, as rod 290 of cylinder 284 is extended, arm 262 initially pivots about pin 264 which is then followed by arm 262 extending down guide path 264 until arm 262 is in its tag inserting position. Similar to the previous embodiment, arm 262 includes a suction cup 268, mounted to its distal end portion, which grabs a lowermost tag in tag holder 222 preferably by vacuum. Extending through arm 262 is a passageway 270, which is in communication with suction cup 268 and a coupler 271, which couples to a vacuum supply system via tubing 274 to supply the vacuum to suction cup 268. In this manner, when a vacuum is generated in passage 270, suction cup 268 will generate a suction force on a lowermost tag supported in tag holder 252 to thereby grab the lowermost tag.

As noted above, tag handler 222 optionally permits adjustment of the angle of arm 262. In the illustrated embodiment, guide block 260 includes a stop 273, which is mounted to back wall 260a of guide block 260 by a plurality of fasteners 275. Preferably, stop 273 is removably mounted to guide block 260 to permit the stop to be repositioned along guide block 260 to thereby vary the angle of arm 262 when it is in its tag grabbing position. In the illustrated embodiment, when arm 262 moves between its tag grabbing position and tag insertion position arm 262 moves through an arc which forms an acute angle. In this manner, tagging system 210 requires a shorter stroke for cylinder 284 and, further, can move between its tag grabbing position and tag insertion position over a shorter period of time; thus, increasing the processing rate of tagging system 210.

Figure 18:
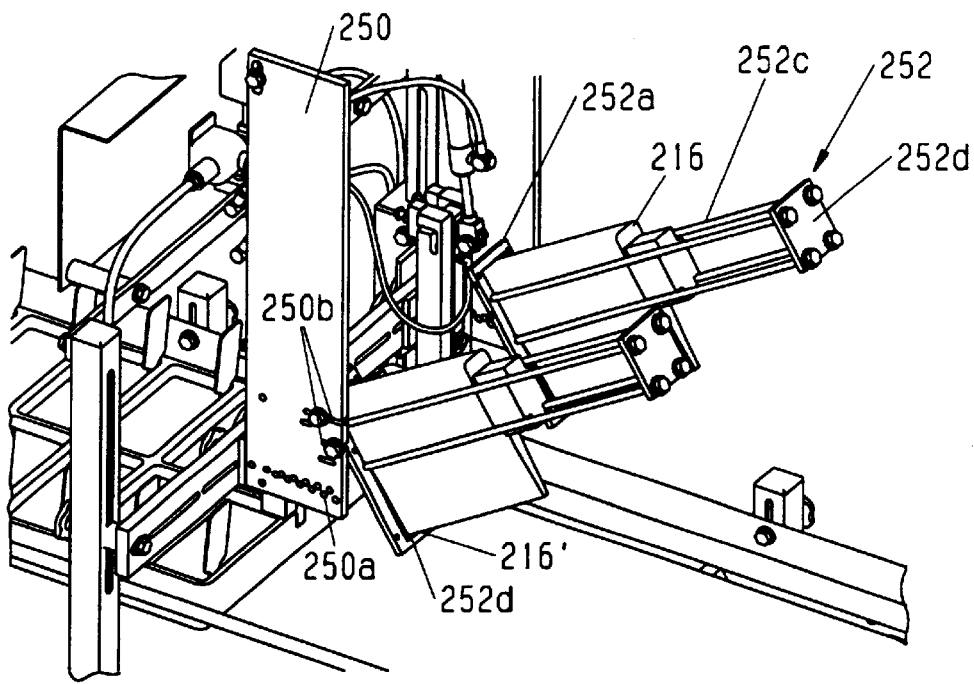
FIG. 18 is another side perspective view of the tag insert assemblies of FIGS. 11–12 and 17.
Figure 17:
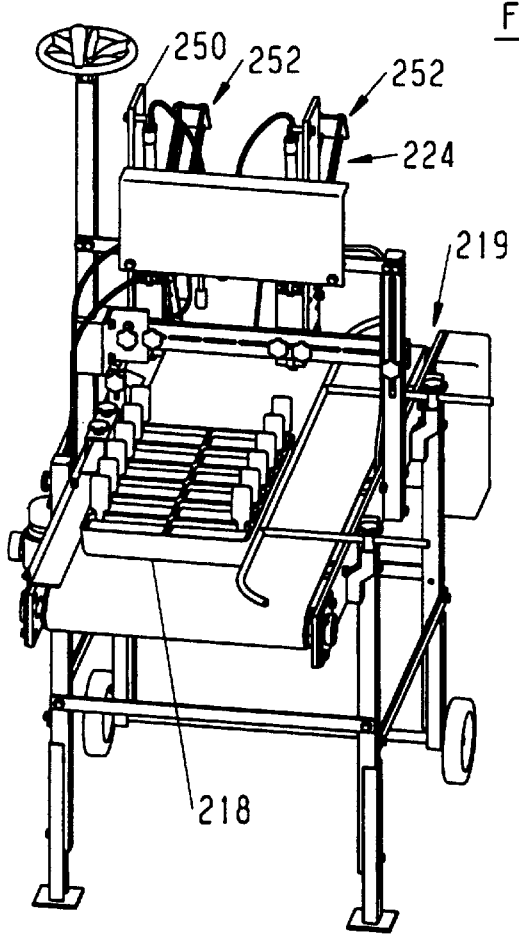
FIG. 17 is a front perspective view of the discharge end of the tagging system of FIG. 11.
Figure 19:
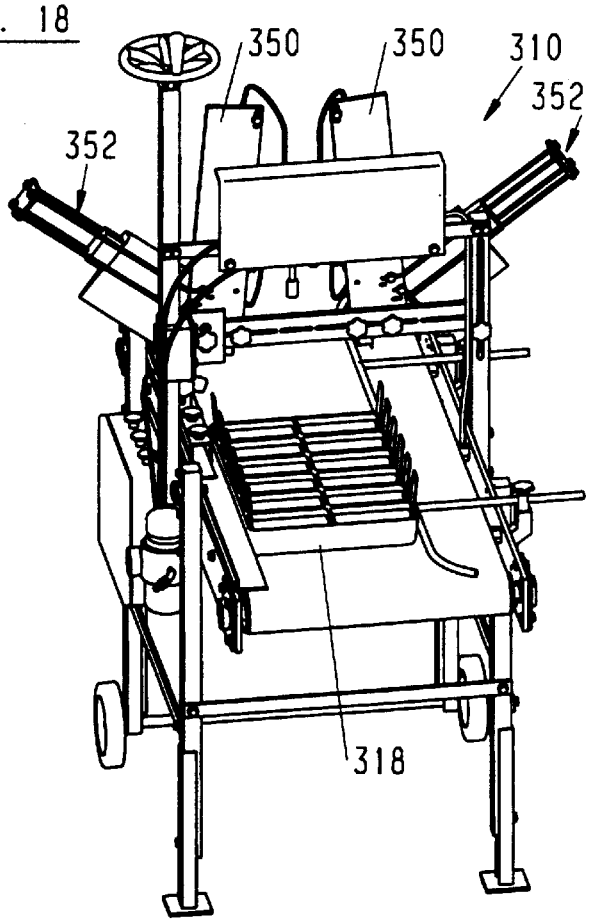
FIG. 19 is a perspective view of a third embodiment of the tagging system of the present invention.
Figure 23:
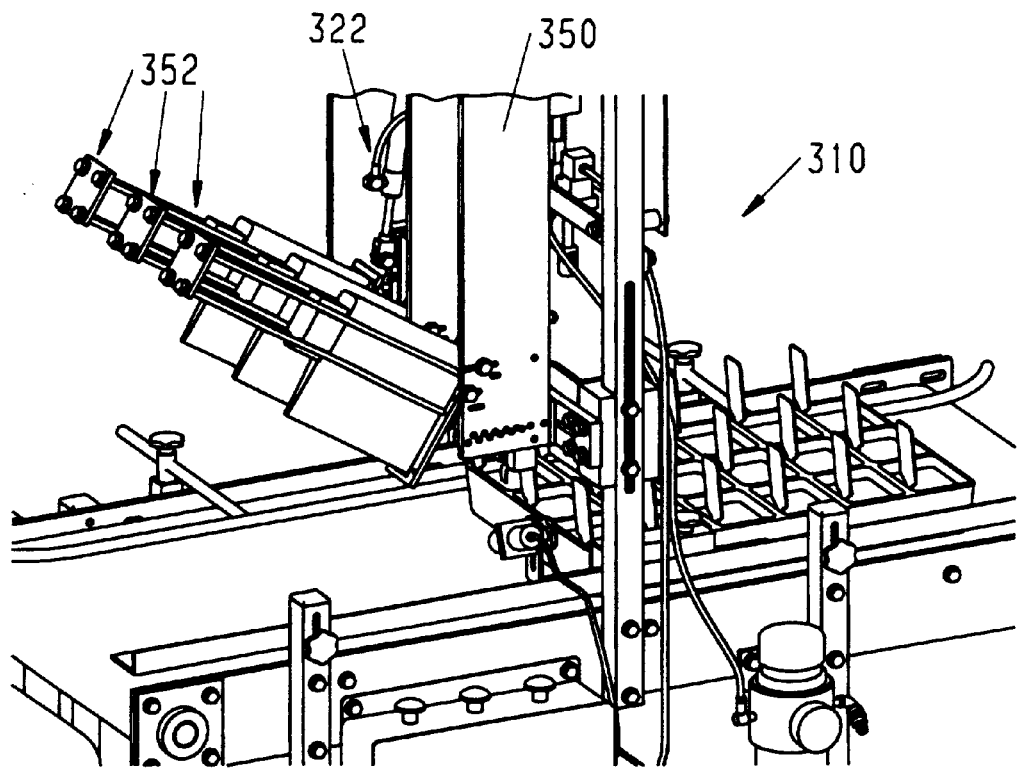
FIG. 23 is a side perspective view of the tagging system of FIG. 19 illustrating the tag insert assemblies rotated to a second orientation.
Figure 20:
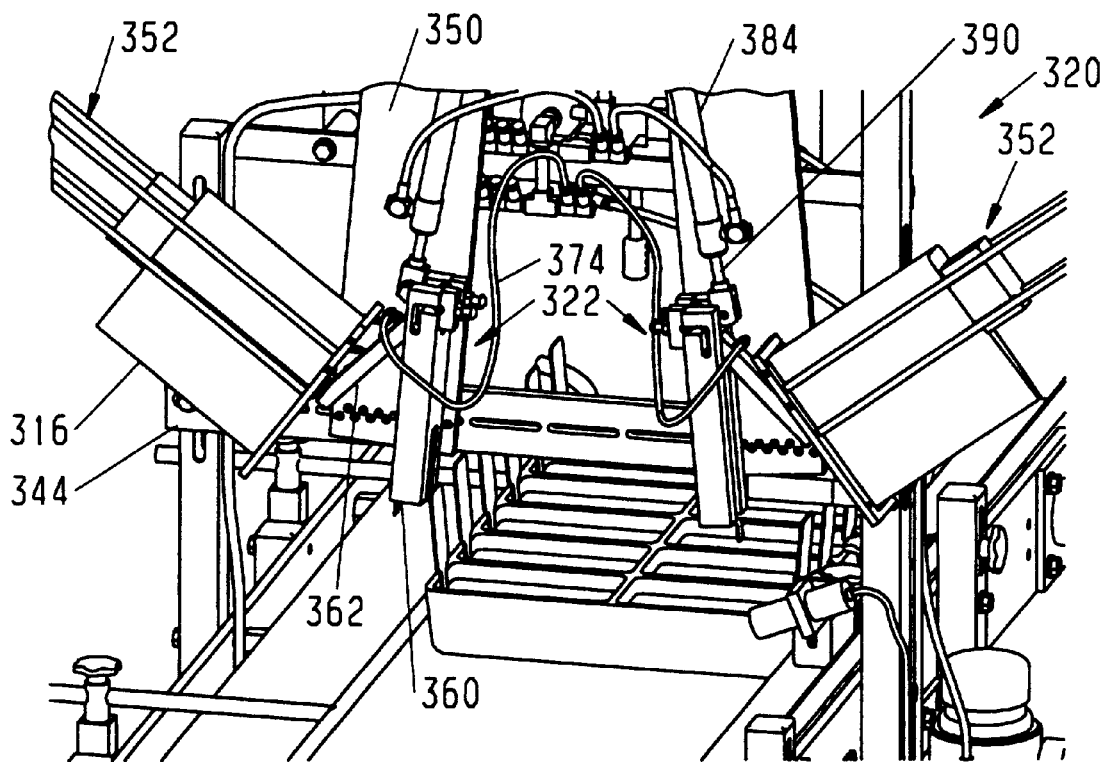
FIG. 20 is a feed end perspective view of the tagging system illustrated in FIG. 20.
Figure 21:
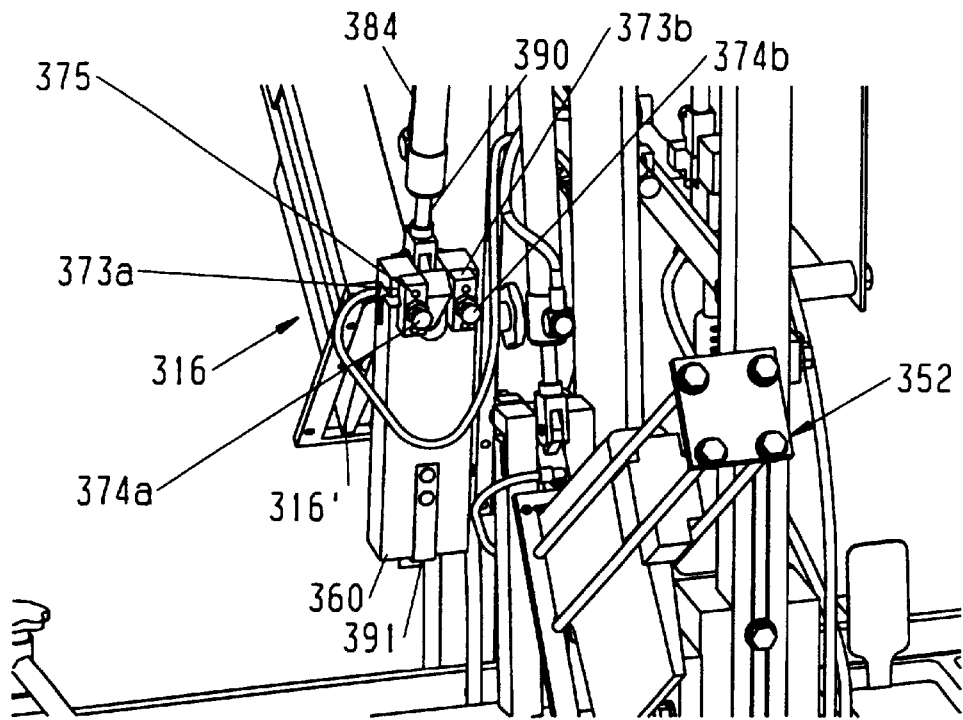
FIG. 21 is an enlarged perspective view of the tag insert assemblies of FIG. 19.
Figure 22:
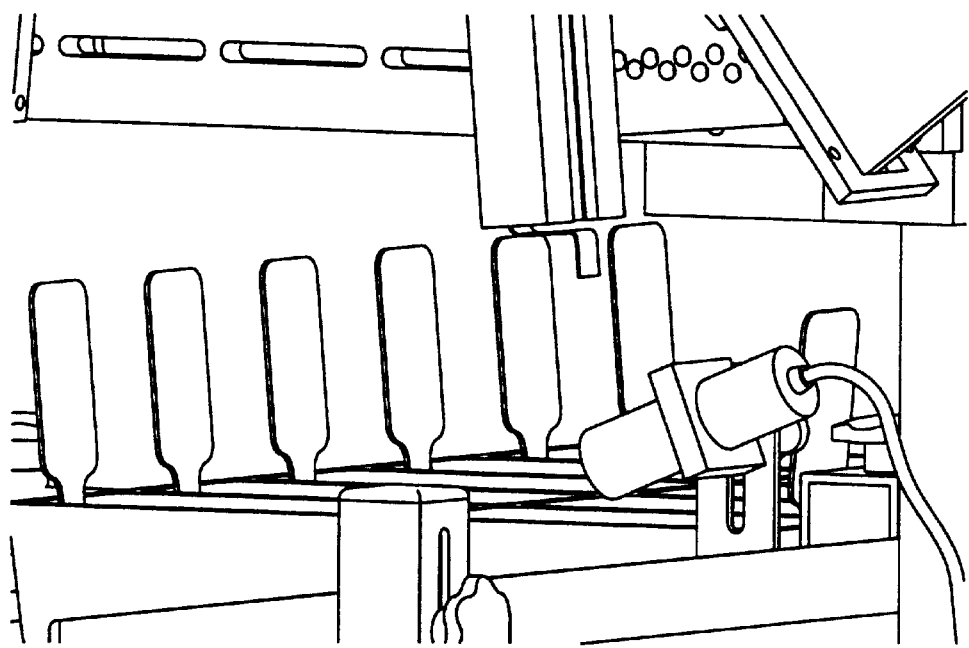
FIG. 22 is an enlarged side perspective view of the tagging system illustrated in FIG. 20 illustrating the sensor of the control system.
Figure 24:
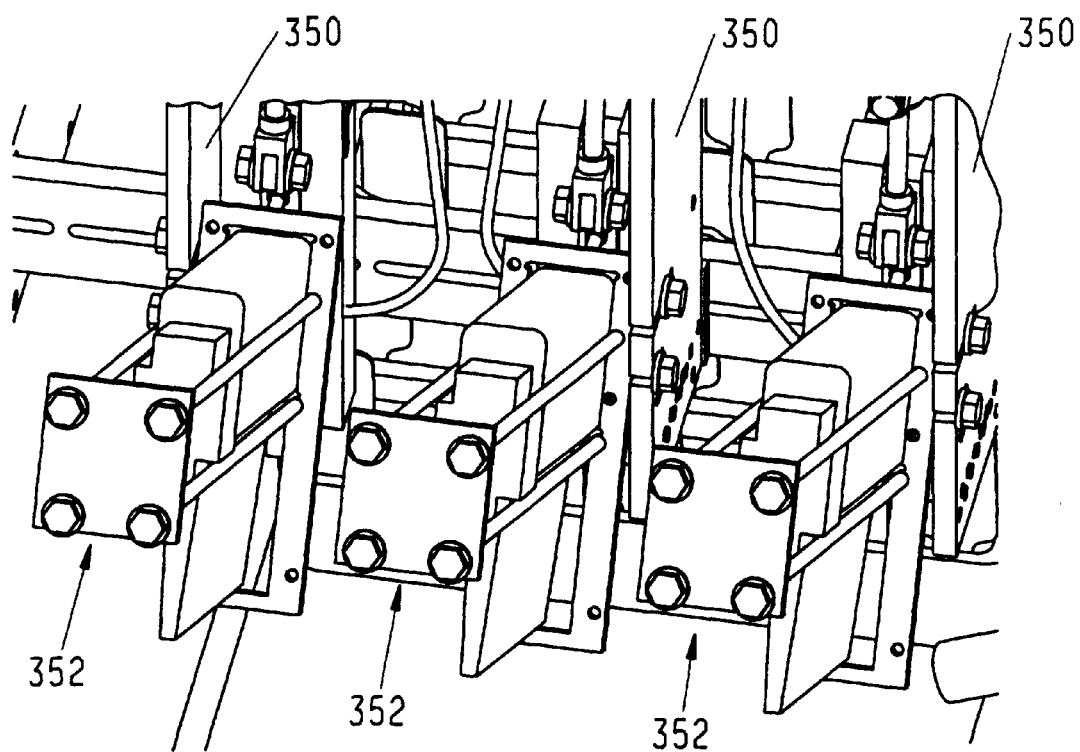
FIG. 24 is an enlarged top perspective view of the tagging system illustrated in FIG. 23 as viewed from the feed end of the tagging system illustrating three tag insert assemblies.
Figure 25:
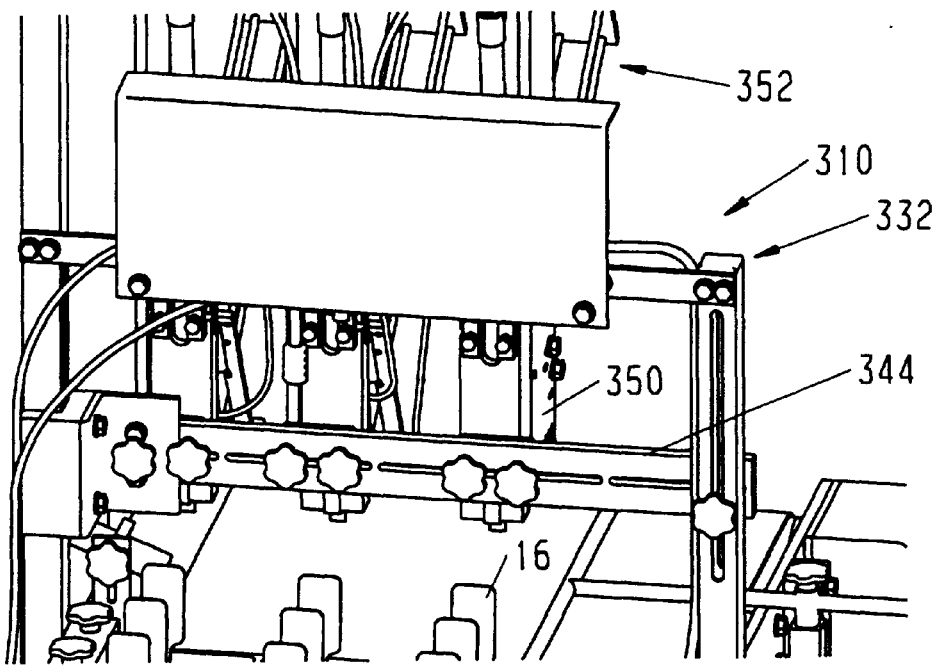
FIG. 25 is an elevation view of the tagging system of FIG. 24 as viewed from the discharge end of the tagging system.

As best seen in FIGS. 16–18, in the illustrated embodiment, tag holders 252 comprise open framed holders which include a base frame member 252a and a top or cover frame member 252b. Extending between base frame member 252a and top frame member 252b, are a plurality of elongate frame members such as bars 252c, preferably round bars, which together with members 252a and 252b define a tag holding cavity therebetween for holding tags 216. Base frame member 252a includes an opening 252d through which a lowermost tag 216' is grabbed by suction cup 268 of arm 262. Opening 252d is slightly smaller than the tags so that the tags are held in holder 252 until they are grabbed by a handler 222. Given the open design of tag holder 252, tag holder 252 permits quick visible assessment of the status of the individual tag holders and further quick filling of the holders.

As best seen in FIG. 18, tag holders 252 and tag handlers 222 are mounted to frame 232 by mounting plates 250. Mounting plates 250 include a plurality of mounting openings 250a, including elongate mounting openings 250b which permit adjustment of the orientation of tag holders 252. In this manner, tag holders 252 and tag handlers 222 may be supported in a number of different orientations depending on the size of the container, the type and size of the plants, the size of the tags, and the needs of the nursery. As a result, like the previous embodiment, tag insert assembly 220 is modular and can be reconfigured as shown such that holders 252 and handlers 222 are aligned in parallel planes which are parallel to the flow of conveyor.

Referring again to FIGS. 15 and 16, guide block 260 optionally includes a wiper 291 which is mounted to the rear surface 260a of guide block 260 by fasteners 293. Each wiper 291 comprises a flexible spring-like plate member and has a generally L-shaped configuration with a downwardly extending lip 291a which contacts the rearward surface of arm 262 when arm 262 is extended through guide block 260. Optionally, inwardly facing surface 291b of wiper 291 may include a low friction material to reduce the friction between wiper 291 and arm 262. In this manner, wiper 291 also provides additional lateral support to arm 262 as arm 262 is extended through guide block 260. As noted in reference to the previous embodiment, arm 262 is laterally supported by guide block 260 in both horizontal directions such that there is minimal play between arm 262 and guide block 260. With reduced play, arm 262 can be extended through guide block 260 at increased speeds to, thereby, increase the processing speed of tagging system 210.

Referring to FIGS. 19–26, a third embodiment of a tagging apparatus 310 is illustrated. Tagging apparatus 310 includes a support surface 312, such as a conveying surface of a conveyor, and a tag insert assembly 320 similar to the previous embodiments. Tag insert assembly 320 includes one or more tag dispensers, which include tag handlers 322 and tag holders 352. Tan handlers 322 and 352, similar to the previous embodiment, are mounted to a tag insert frame 332 by mounting plates 350. Tag holders 352 are of similar construction to tag holders 252; therefore, reference is made to the previous embodiment for further details of tag holders 252. Similar to the previous embodiment, each mounting plate 350 includes a plurality of mounting opening to permit adjustment of the orientations of tag holders 352 and tag handlers 322.

As best seen in FIGS. 20 and 26–30, each tag handler 322 includes a guide 360 and a pivot arm 362. In the illustrated embodiment, arm 362 includes a pair of outwardly extending guide pins 364a and 364b (FIG. 30) which guide arm 362 down inverted L-shape tracks 365 formed in guide 360 in a similar manner to the previous embodiment. The angle of arm 362 is adjusted by a pair of stops 373. Stops 373 include blocks 373a and 373b, which are mounted to block 360 by fasteners (not shown). Each block 373a and 373b includes an arcuate groove that form the terminal ends of L-shaped tracks 365 and a threaded adjuster or positioner 374a and 364b. Similar to stop 273, stops 373 adjust the angular orientation of arm 362 by varying the terminal end of tracks 365. Threaded positioners 374a and 374b extend into the track 365 through transverse openings provided in blocks 373a, 373b to form stops for guide pins 364a to thereby adjust the position of guide pins 364a in tracks 365 and as such vary the terminal end of the tracks. In this manner, the arm 362 can be adjusted by simply adjusting threaded positioner 374a, 374b.

Figure 30:
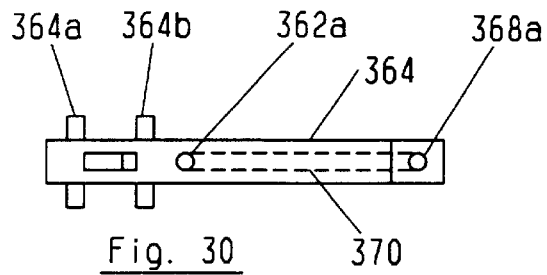
FIG. 30 is a plan view of the pivot arm of FIGS. 26–28.
Figure 28:
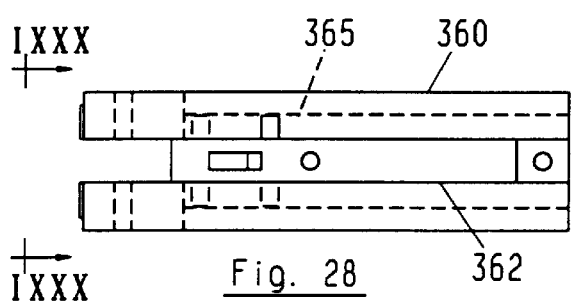
FIG. 28 is a plan view of the tag insert assembly of FIG. 26.
Figure 29:
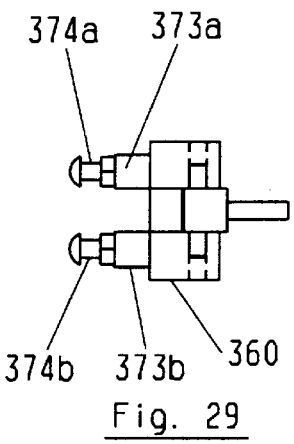
FIG. 29 is an end view of the slide block taken along line IXXX—IXXX of FIG. 28.
Figure 27:
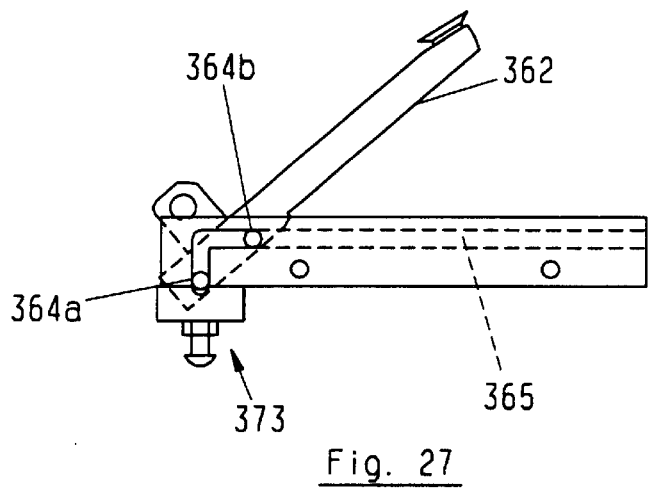
FIG. 27 is a side elevation view of the tag handler of FIG. 26 illustrating the pivot arm in the tag engaging position.
Figure 26:
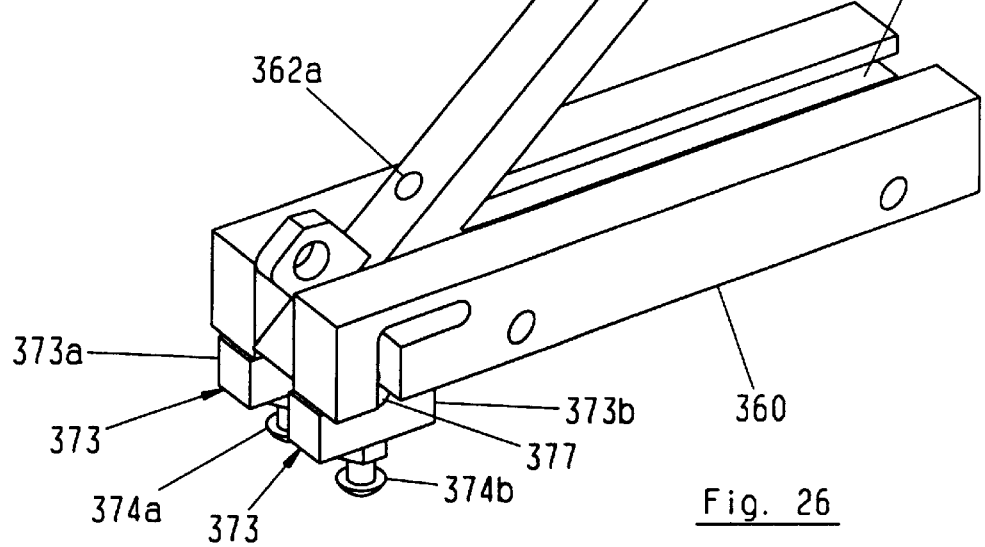
FIG. 26 is a perspective view of a tag handler of the tagging system of FIGS. 19–24 illustrating a pivot arm pivoted to a tag engaging position within a guide block.

Similar to the previous embodiment, arm 362 supports a suction cup 368 which permits the tag handler 322 to grab a tag from tag holder 352 using a vacuum. As best seen in FIG. 30, arm 362 includes a transverse passage 370 which is in communication with suction cup 368 through a port 368a and extend to a port 362a in arm 362 to permit coupling to a vacuum generator by hose 374.

While several forms of the invention have been shown and described, further modifications would be understood by those skilled in the art. Changes and modifications in the specifically described embodiments can be carried out without departing from the principles of the invention, which is intended to be limited only by the scope of the appended claims, as interpreted according to the principles of patent law.

We claim:

1. A tagging apparatus for placing tags into a container, said tagging apparatus comprising:

a tag insert assembly frame;

a tag holder;

a tag handler mounted to said tag insert assembly frame, said tag handler including an arm and a guide, said guide having a transverse passage defining an upper open end and a lower open end, said arm configured for reciprocal movement between a first position in which said arm is positioned for grabbing a tag from said tag holder and a second position in which said arm is positioned for inserting the tag into a container supported on a support surface, said arm extending and moving through said passage of said guide when said arm is moved between said first position and said second position wherein said guide provides lateral support to said arm when said arm is moved between its first and second positions and, further, defining a path of movement for said arm between said first and second positions; and a driver for moving said arm between said first and second positions.

2. The tagging apparatus according to claim 1, wherein said tag holder is mounted to said tag insert assembly frame.

3. The tagging apparatus according to claim 1, further comprising a conveyor assembly, said conveyor assembly having a conveyor frame and a conveying surface, said conveying surface supported on said conveyor frame and defining a support surface, said tag insert assembly frame being supported on said conveyor frame.

4. The tagging apparatus according to claim 1, wherein said driver comprises a cylinder.

5. The tagging apparatus according to claim 4, wherein said cylinder comprises a pneumatic cylinder.

6. The tagging apparatus according to claim 4, wherein said cylinder is supported by said tag insert assembly frame.

7. The tagging apparatus according to claim 1, wherein said arm includes a suction cup for grabbing a tag.

8. The tagging apparatus according to claim 7, wherein said suction cup is coupled to a vacuum system, said vacuum system generating a vacuum in said suction to grip a tag and releasing the grip of said suction cup on a tag when said tag is inserted into said container.

9. The tagging apparatus according to claim 1, wherein said guide member includes a L-shaped guide path, said arm being moved along said L-shaped guide path by said driver.

10. The tagging apparatus according to claim 9, wherein said arm includes at least one guide member for positioning in said L-shaped guide path, wherein said guide member guides said arm along said L-shaped guide path.

11. The tagging apparatus according to claim 10, wherein said guide member comprises a channel-shaped member.

12. A tagging apparatus for placing tags into a container, said tagging apparatus comprising:

a tag insert assembly frame;

a tag holder;

a tag handler mounted to said tag insert assembly frame, said tag handler including an arm and a guide, said arm configured for reciprocal movement between a first position in which said arm is positioned for grabbing a tag from said tag holder and a second position in which said arm is positioned for inserting the tag into a container supported on a support surface, said guide comprising a channel-shaped member having an elongate passage, said arm extending through said elongate passage when moving between its first and second positions wherein said guide provides lateral support to said arm when said arm is moved between its first and second positions and, further, defining a path of movement for said arm between said first and second positions; and a driver for moving said arm between said first and second positions.

13. The tagging apparatus according to claim 12, wherein said arm is guided in said passage of said channel-shaped member by a carriage member.

14. The tagging apparatus according to claim 13, wherein said arm is pivotally mounted to said carriage.

15. The tagging apparatus according to claim 13, wherein said arm is pivotally moved to said carriage member.

16. The tagging apparatus according to claim 15, wherein said arm includes a suction cup for grabbing a tag.

17. The tagging apparatus according to claim 12, wherein said guide member includes an L-shaped guide path, said arm being moved along said L-shaped guide path by said driver.

18. The tagging apparatus according to claim 17, wherein said guide path further includes an adjustable stop, said adjustable stop adjusting the generally L-shaped guide path in order to adjust the angle of said arm when said arm is in said first position.

19. A tagging apparatus for placing tags into a container, said tagging apparatus comprising:

a support surface;

a tag insert assembly positioned over said support surface, said tag insert assembly having a support frame and at least one tag dispenser;

said tag dispenser including a tag holder for holding a stack of tags and a tag handler, said tag handler including a pivot arm and a guide member, said guide member guiding said arm to move between a first position in which said arm is positioned for grabbing a tag from said tag holder and a second position in which said arm is positioned for inserting a tag into a container supported on said support surface, said guide member having a guide path and spaced apart facing sides, said arms being supported between said spaced apart facing sides wherein said guide member provides lateral support to said arm when said arm is moved between said first and second positions; and a driver moving said arm between said first and second positions.

20. The tagging apparatus according to claim 19, wherein said guide path is a generally L-shaped guide path.

21. The tagging apparatus according to claim 19, wherein said arm includes a suction cup for grabbing a tag from said tag holder.

22. The tagging apparatus according to claim 21, wherein said arm comprises a elongate block member.

23. The tagging apparatus according to claim 22, wherein said arm includes a suction cup at a distal portion of said elongate block member.

24. The tagging apparatus according to claim 23, wherein said guide member further includes an adjustable stop, said adjustable stop adjusting the generally L-shaped guide path in order to adjust the angle of said arm when said arm is in said first position.

25. The tagging apparatus according to claim 22, wherein said elongate block member includes a transverse passage extending through said arm and in communication with said suction cup, said passage further being adapted to communicate with a pneumatic supply for generating a vacuum in said suction cup for grabbing a tag from said tag holder.

26. The tagging apparatus according to claim 22, wherein said guide member includes a generally L-shaped guide path.

27. The tagging apparatus according to claim 19, wherein said guide member comprises a plastic guide member.

28. The tagging apparatus according to claim 19 wherein said arm includes at least one guide pin, said guide pin engaging said guide path and guiding said arm between said first and second positions.

29. The tagging apparatus according to claim 28, wherein said arm includes a pair of said guide pin, said guide pins engaging said guide path of said guide member to guide said arm between said first and second positions.

30. The tagging apparatus according to claim 19, wherein said tag holder includes an open frame.

31. The tagging apparatus according to claim 30, wherein said tag holder includes a base frame member and a cover frame member and a plurality of elongated frame members extending between and connecting to said base frame member and said cover frame member to thereby form said open frame.

32. The tagging apparatus according to claim 19, wherein said tag handler is positionable on said support frame in at least one of a plurality of orientations whereby said tag insert assembly is adjustable to accommodate a variety of container sizes.

33. The tagging apparatus according to claim 19, further comprising a conveyor, said conveyor including a conveying surface defining said support surface.

34. The tagging apparatus according to claim 33, wherein said tag insert assembly frame is mounted to said conveyor.

35. A tagging apparatus for placing tags into a container, said tagging apparatus comprising:

a support surface;

a tag insert assembly positioned over said support surface, said tag insert assembly having a support frame and at least one tag dispenser;

said tag dispenser including a tag holder for holding a stack of tags and a tag handler, said tag handler including a pivot arm and a guide member, said guide member guiding said arm to move between a first position in which said arm is positioned for grabbing a tag from said tag holder and a second position in which said arm is positioned for inserting a tag into a container supported on said support surface, said guide member having a guide path and spaced apart facing sides providing lateral support to said arm when said arm being between said first and second positions; and a driver moving said arm between said first and second positions, wherein said guide path is a generally L-shaped guide path and said guide member comprises a channel-shaped member defining said spaced apart facing sides.

36. The tagging apparatus according to claim 35, wherein said arm is guided in said guide path by a carriage member.

37. The tagging apparatus according to claim 36, wherein said arm is pivotally mounted to said carriage member.

38. The tagging apparatus according to claim 35, wherein said guide member further includes an adjustable stop, said adjustable stop adjusting said L-shaped guide path in order to adjust the angle of said arm when said arm is in said first position.

39. A tag handler of a tagging apparatus, said tag handler for inserting a plurality of tags into a container, said tag insert assembly comprising;

a guide member having a generally channel-shaped cross-section defining an elongate passage therealong; and an arm having a proximate portion and a distal portion, said distal portion including a suction cup, said proximate portion pivotal mounted in said elongate passage, said arm being adapted to move through said elongate passage from a first position in which said proximate portion pivots in said elongate passage and said distal portion of said arm is pivoted outwardly from said guide member for positioning to grip a tag from a tag holder with said suction cup and a second position in which said arm is aligned in said elongate passage and moved along said elongate passage with said distal portion extended from said elongate passage for positioning to insert a tag into a container.

40. The tag handler according to claim 39, wherein said guide member comprises a plastic guide member.

41. The tag handler according to claim 40, wherein said guide includes a pair of guide tracks in said elongate passage, said arm including guide pins for engaging said guide tracks to guide said arm along said elongate passage.

42. The tag handler according to claim 41, wherein said tracks comprise L-shaped tracks.

43. The tag handler according to claim 42, wherein said L-shaped tracks have terminal ends, said terminal ends being adjustable to adjust the angular orientation of said arm when said arm is moved to said first position.

44. The tag handler according to claim 39, wherein said arm comprises an elongate block member.

45. The tag handler according to claim 44, wherein said arm includes an internal passage in communication with said suction cup and a port for coupling to a vacuum supply for generating a vacuum in said suction cup.

* * * * *

UNITED STATES PATENT AND TRADEMARK OFFICE
CERTIFICATE OF CORRECTION

PATENT NO. : 6,442,914 B1
DATED : September 3, 2002
INVENTOR(S) : Randall H. Timmer and Stephen P. Shaw It is certified that error appears in the above-identified patent and that said Letters Patent is hereby corrected as shown below:

<u>Column 11,</u>
Line 19, "defining" should be -- defines --

Signed and Sealed this

Twenty-fifth Day of January, 2005

JON W. DUDAS
*Director of the United States Patent and Trademark Office*